US008068245B2

(12) United States Patent
Gardner et al.

(10) Patent No.: US 8,068,245 B2
(45) Date of Patent: Nov. 29, 2011

(54) PRINTING DEVICE COMMUNICATION PROTOCOL

(75) Inventors: Deane A. Gardner, Cupertino, CA (US); Philip Hsueh, Fremont, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 1152 days.

(21) Appl. No.: 10/966,019

(22) Filed: Oct. 15, 2004

(65) Prior Publication Data
US 2006/0082811 A1   Apr. 20, 2006

(51) Int. Cl.
*G06F 3/12*   (2006.01)
*G06K 15/00*   (2006.01)

(52) U.S. Cl. ...................... 358/1.15; 358/1.13

(58) Field of Classification Search ............... 358/1.15, 358/1.13, 1.14, 1.16, 1.17, 1.18, 1.1, 1.2, 358/1.6, 1.9, 1.11, 400, 401, 405, 407, 426.03, 358/426.04, 426.07, 426.11, 426.13, 426.14, 358/426.15, 426.16, 468, 434, 435, 436, 358/437, 438, 439; 382/232, 233, 234, 235, 382/236, 237, 238, 239, 246, 248; 710/314, 710/315, 105, 11; 709/230, 236, 247; 347/2, 347/3, 5, 14, 23; 399/1, 8
See application file for complete search history.

(56) References Cited

U.S. PATENT DOCUMENTS

| | | | |
|---|---|---|---|
| 4,486,739 A | 12/1984 | Franaszek et al. |
| 4,563,689 A | 1/1986 | Murakami et al. |
| 5,138,333 A | 8/1992 | Bartky et al. |
| 5,150,048 A | 9/1992 | McAuliffe et al. |
| 5,359,350 A | 10/1994 | Nakano et al. |
| 5,361,084 A | 11/1994 | Paton et al. |
| 5,361,420 A | 11/1994 | Dobbs et al. |
| 5,369,420 A | 11/1994 | Bartky |
| 5,408,590 A | 4/1995 | Dvorzsak |
| 5,438,350 A | 8/1995 | Kerry |
| 5,463,414 A | 10/1995 | Temple et al. |
| 5,463,416 A | 10/1995 | Paton et al. |
| 5,512,796 A | 4/1996 | Paton |
| 5,512,922 A | 4/1996 | Paton |
| 5,521,619 A | 5/1996 | Suzuki et al. |

(Continued)

FOREIGN PATENT DOCUMENTS

CN    1410780 A    4/2003

(Continued)

OTHER PUBLICATIONS

U.S. Appl. No. 10/966,022, filed Oct. 15, 2004, Gardner.

(Continued)

*Primary Examiner* — Dov Popovici
(74) *Attorney, Agent, or Firm* — Fish & Richardson P.C.

(57) ABSTRACT

Techniques, systems, and computer program products for transmitting data between a computer system and an external printing device. A technique may include generating a data packet in accordance with a communications protocol such that generating the data packet includes encoding the data packet according to a second layer of the protocol in a frame format according to a third layer of the protocol, transmitting the data packet from the computer system to the external printing device according to the first layer of the protocol; and decoding the data packet in accordance with the second layer of the protocol. The protocol can be defined to include three layers. In that protocol, a first layer may define transmission line, transmitters, and receivers for transmission, the second layer may define encoding and decoding, and the third layer may define a frame format of the data packet.

31 Claims, 9 Drawing Sheets

U.S. PATENT DOCUMENTS

| | | | |
|---|---|---|---|
| 5,604,771 A * | 2/1997 | Quiros | 375/326 |
| 5,631,675 A | 5/1997 | Futagawa | |
| 5,663,217 A | 9/1997 | Kruse | |
| 5,668,579 A | 9/1997 | Fujii et al. | |
| 5,731,048 A | 3/1998 | Ashe et al. | |
| 5,779,837 A | 7/1998 | Harvey | |
| 5,784,062 A | 7/1998 | Adachi et al. | |
| 5,784,171 A | 7/1998 | Kano | |
| 5,790,139 A | 8/1998 | Umeno et al. | |
| 5,825,375 A | 10/1998 | Droit et al. | |
| 5,837,046 A | 11/1998 | Schofield et al. | |
| 5,842,258 A | 12/1998 | Harvey et al. | |
| 5,843,219 A | 12/1998 | Griffin et al. | |
| 5,854,886 A | 12/1998 | MacMillan et al. | |
| 5,855,713 A | 1/1999 | Harvey | |
| 5,903,754 A | 5/1999 | Pearson | |
| 5,910,372 A | 6/1999 | Griffin et al. | |
| 5,941,951 A | 8/1999 | Day et al. | |
| 5,959,643 A | 9/1999 | Temple et al. | |
| 5,975,672 A | 11/1999 | Wen | |
| 5,984,448 A | 11/1999 | Yanagawa | |
| 5,984,464 A | 11/1999 | Steinfield et al. | |
| 5,997,124 A | 12/1999 | Capps et al. | |
| 6,010,202 A | 1/2000 | Arnott | |
| 6,014,153 A | 1/2000 | Harvey | |
| 6,033,055 A | 3/2000 | Nagoshi et al. | |
| RE36,667 E | 4/2000 | Michaelis et al. | |
| 6,046,822 A | 4/2000 | Wen et al. | |
| 6,088,050 A | 7/2000 | Ng | |
| 6,089,698 A | 7/2000 | Temple et al. | |
| 6,092,886 A | 7/2000 | Hosono | |
| 6,102,513 A | 8/2000 | Wen | |
| 6,106,092 A | 8/2000 | Norigoe et al. | |
| 6,123,405 A | 9/2000 | Temple et al. | |
| 6,185,620 B1 | 2/2001 | Weber et al. | |
| 6,193,343 B1 | 2/2001 | Norigoe et al. | |
| 6,217,141 B1 | 4/2001 | Nakamura et al. | |
| 6,228,311 B1 | 5/2001 | Temple et al. | |
| 6,232,135 B1 | 5/2001 | Ashe et al. | |
| 6,257,689 B1 | 7/2001 | Yonekubo | |
| 6,260,951 B1 | 7/2001 | Harvey et al. | |
| 6,270,179 B1 | 8/2001 | Nou | |
| 6,276,772 B1 | 8/2001 | Sakata et al. | |
| 6,281,913 B1 | 8/2001 | Webb | |
| 6,286,943 B1 | 9/2001 | Ashe et al. | |
| 6,295,077 B1 | 9/2001 | Suzuki | |
| 6,312,076 B1 | 11/2001 | Taki et al. | |
| 6,328,395 B1 | 12/2001 | Kitahara et al. | |
| 6,331,040 B1 | 12/2001 | Yonekubo et al. | |
| 6,331,045 B1 | 12/2001 | Harvey et al. | |
| 6,339,480 B1 | 1/2002 | Yamada et al. | |
| 6,352,328 B1 | 3/2002 | Wen et al. | |
| 6,379,440 B1 | 4/2002 | Tatum et al. | |
| 6,384,930 B1 | 5/2002 | Ando | |
| 6,399,402 B2 | 6/2002 | Ashe et al. | |
| 6,402,278 B1 | 6/2002 | Temple | |
| 6,402,282 B1 | 6/2002 | Webb | |
| 6,412,924 B1 | 7/2002 | Ashe et al. | |
| 6,422,690 B1 | 7/2002 | Harvey et al. | |
| 6,437,879 B1 | 8/2002 | Temple | |
| 6,460,991 B1 | 10/2002 | Temple et al. | |
| 6,467,863 B1 | 10/2002 | Imanaka et al. | |
| 6,468,779 B1 | 10/2002 | Red'kina | |
| 6,471,315 B1 | 10/2002 | Kurata | |
| 6,476,096 B1 | 11/2002 | Molloy et al. | |
| 6,505,918 B1 | 1/2003 | Condie et al. | |
| 6,517,195 B1 | 2/2003 | Koeda | |
| 6,565,191 B1 | 5/2003 | Bolash et al. | |
| 6,568,779 B1 | 5/2003 | Pulman et al. | |
| 6,572,221 B1 | 6/2003 | Harvey et al. | |
| 6,652,068 B2 | 11/2003 | Hsu et al. | |
| 6,666,537 B1 | 12/2003 | Kelley et al. | |
| 6,685,297 B2 | 2/2004 | Butterfield et al. | |
| 6,728,803 B1 | 4/2004 | Nelson et al. | |
| 6,752,482 B2 | 6/2004 | Fukano et al. | |
| 6,764,154 B2 | 7/2004 | Nishikori et al. | |
| 6,882,711 B1 | 4/2005 | Nicol | |
| 7,076,724 B2 * | 7/2006 | Cole et al. | 714/784 |
| 7,234,788 B2 | 6/2007 | Gardner | |
| 7,234,799 B2 | 6/2007 | Gardner | |
| 7,436,540 B2 | 10/2008 | Okamoto et al. | |
| 2002/0033644 A1 | 3/2002 | Takamura | |
| 2002/0186393 A1 | 12/2002 | Pochuer et al. | |
| 2003/0081227 A1 | 5/2003 | Williams et al. | |
| 2003/0160836 A1 | 8/2003 | Fukano et al. | |
| 2004/0000560 A1 | 1/2004 | Henry et al. | |
| 2004/0028830 A1 | 2/2004 | Bauer | |
| 2004/0070791 A1 | 4/2004 | Pattusamy et al. | |
| 2004/0113959 A1 | 6/2004 | Tamura | |
| 2005/0018940 A1 | 1/2005 | Obayashi | |
| 2005/0041073 A1 | 2/2005 | Fontaine et al. | |
| 2005/0195229 A1 | 9/2005 | Barss | |
| 2005/0270329 A1 | 12/2005 | Hoisington et al. | |
| 2006/0066701 A1 | 3/2006 | Hirakawa | |
| 2006/0082797 A1 | 4/2006 | Gardner | |
| 2006/0082812 A1 | 4/2006 | Gardner | |
| 2006/0082813 A1 | 4/2006 | Martin et al. | |
| 2006/0082814 A1 | 4/2006 | Gardner | |
| 2006/0087523 A1 | 4/2006 | Horsnell et al. | |
| 2006/0092201 A1 | 5/2006 | Gardner | |
| 2006/0092437 A1 | 5/2006 | Martin | |
| 2007/0206038 A1 | 9/2007 | Baker | |
| 2007/0236535 A1 | 10/2007 | Baker et al. | |
| 2008/0158279 A1 | 7/2008 | Barss | |

FOREIGN PATENT DOCUMENTS

| | | |
|---|---|---|
| CN | 101040505 | 9/2007 |
| CN | 101052942 A | 10/2007 |
| CN | 101052943 | 10/2007 |
| CN | 101052974 | 10/2007 |
| CN | 101091153 A | 12/2007 |
| CN | 101189622 | 5/2008 |
| EP | 0 375 147 | 6/1990 |
| EP | 0 600 707 | 6/1994 |
| EP | 0 810 097 | 12/1997 |
| EP | 0 876 915 | 11/1998 |
| EP | 0 919 382 | 6/1999 |
| EP | 0 964 339 | 12/1999 |
| EP | 1 212 201 | 6/2002 |
| EP | 1 267 254 | 12/2002 |
| EP | 1 293 341 | 3/2003 |
| EP | 1 452 313 | 9/2004 |
| EP | 1452313 A1 * | 9/2004 |
| EP | 0 827 838 | 3/2005 |
| EP | 1 805 593 | 7/2007 |
| EP | 1 810 127 | 7/2007 |
| EP | 1 810 223 | 7/2007 |
| EP | 1 810 482 | 7/2007 |
| EP | 1 820 087 | 8/2007 |
| EP | 1 820 088 | 8/2007 |
| JP | 58055253 | 4/1983 |
| JP | 03065069 | 3/1991 |
| JP | H06-113143 | 4/1994 |
| JP | H09-058019 | 3/1997 |
| JP | H09-102861 | 4/1997 |
| JP | 09-231035 | 9/1997 |
| JP | 10-031566 | 2/1998 |
| JP | 10-336413 | 12/1998 |
| JP | H11-58891 | 3/1999 |
| JP | 11-123861 | 5/1999 |
| JP | 11-338651 | 12/1999 |
| JP | 2000-6389 | 1/2000 |
| JP | 2000-141829 | 5/2000 |
| JP | 2000-255019 | 9/2000 |
| JP | 2000-326560 | 11/2000 |
| JP | 2000-246862 | 12/2000 |
| JP | 2001-001570 | 1/2001 |
| JP | 2001010035 | 1/2001 |
| JP | 2001-334706 | 12/2001 |
| JP | 2002-512766 | 4/2002 |
| JP | 2002-171257 | 6/2002 |
| JP | 2002-292935 | 10/2002 |
| JP | 2002-540701 | 11/2002 |
| JP | 2003-1879 | 1/2003 |
| JP | 2003-001879 | 1/2003 |
| JP | 2003-500899 | 1/2003 |
| JP | 2003-244391 | 8/2003 |

| | | |
|---|---|---|
| JP | 2004-094586 | 3/2004 |
| JP | 2004-221629 | 8/2004 |
| JP | 2004-268511 | 9/2004 |
| JP | 08-516801 | 5/2008 |
| JP | 08-517379 | 5/2008 |
| JP | 2008-516802 | 5/2008 |
| JP | 2008-516803 | 5/2008 |
| JP | 2008-517380 | 5/2008 |
| JP | 2008-517811 | 5/2008 |
| KR | 2007-0062532 | 6/2007 |
| KR | 2007-0062549 | 6/2007 |
| KR | 2007-0065348 | 6/2007 |
| KR | 2007-0065383 | 6/2007 |
| KR | 2007-0065384 | 6/2007 |
| KR | 2007-0095277 | 9/2007 |
| WO | 99/52253 | 10/1999 |
| WO | 00/58842 | 10/2000 |
| WO | WO 01/12444 | 2/2001 |
| WO | WO 01/13328 | 2/2001 |
| WO | 03/094502 | 11/2003 |
| WO | WO 2004/00560 | 12/2003 |
| WO | WO 2005/018940 | 3/2005 |
| WO | WO 2006/044530 | 4/2006 |
| WO | WO 2006/044587 | 4/2006 |
| WO | WO 2006/044597 | 4/2006 |
| WO | WO 2006/044598 | 4/2006 |
| WO | WO 2006/044599 | 4/2006 |
| WO | WO 2006/049836 | 5/2006 |
| WO | WO 2006/052466 | 5/2006 |
| WO | WO 2006/052885 | 5/2006 |

OTHER PUBLICATIONS

U.S. Appl. No. 10/966,205, filed Oct. 15, 2004, Gardner.
U.S. Appl. No. 10/966,023, filed Oct. 15, 2004, Gardner et al.
U.S. Appl. No. 10/966,024, filed Oct. 15, 2004, Gardner et al.
U.S. Appl. No. 10/977,298, filed Oct. 29, 2004, Martin.
"Fibre Channel—Physical and Signaling Interface (FC-PH)", American National Standards Institute, ANSI X3.230-1994.
Sachs, "Fibre Channel and Related Standards", IEEE Communications Magazine, IEEE Service Center, vol. 34, Aug. 1996, pp. 40-50.
8B/10B-encoding scheme. (8 pages) [Online], [retrieved on Mar. 20, 2009]. Retrieved from the Internet: <URL:http://en.wikipedia.org/wiki/8B/10B_encoding>.
Fibre Channel Protocol. (7 pages). [Online], [retrieved on Sep. 7, 2008]. Retrieved from the Internet: <URL:http://en.wikipedia.org/wiki/Fibre_Channel_Protocol>.
IEEE 802.3 Standard. (4 pages)[Online], [retrieved on Mar. 20, 2009]. Retrieved from the Internet: <URL:http://en.wikipedia.org/wiki/IEEE802.3>.
David A. Johns et al., "Analog Integrated Circuit Design", John Wiley & Sons, Inc., 1997. pp. 39-42, 396-397 and 398-400. Published in U.S.A. and Canada.
European Patent Office Communication pursuant to Article 94(3) EPC for Application No. 05807759.5, dated Mar. 24, 2009, 4 pgs. (171EP1).
Chinese Office Action dated Jun. 6, 2008 issued in CN2005800375139, 9 pgs. (181CN1).
Chinese Office Action dated Sep. 25, 2009 issued in CN200580035221.1, 20 pgs. (168CN1).
Chinese Office Action dated Sep. 4, 2009 issued in CN200580043211.2, 11 pgs. (170CN1).
European Office Action dated Jun. 8, 2010 issued in EP05 807 451.9, 6 pgs. (0170EP1).
Office Action dated Jul. 29, 2009 issued in U.S. Appl. No. 10/966,205, 4 pgs. (169001).
Japanese Office Action dated Aug. 17, 2010 issued in JP2007-536913, 3 pgs., (171JP1).
Japanese Office Action dated Aug. 10, 2010 issued in JP2007-536879, 5 pgs. (167JP1).
Japanese Office Action dated Jul. 13, 2010 issued in JP2007-536905, 6 pgs. (168JP1).
Office Action dated Oct. 12, 2010 issued in Japanese Application No. 2007-538968 and uncertified translation thereof.
Office Action dated Feb. 12, 2010 issued in Chinese Application No. 200580035215.6 and uncertified translation thereof.
Machine Translation of Japanese Patent No. JP-10-336413 available from Patent Abstracts of Japan, http://www4.ipdl.inpit.go.jp/Tokujitu/tjsogodben.ipdl?N0000=115, 12 pgs, Dec. 1998.
Machine Translation of Japanese Patent No. JP-2000-141829 available from Patent Abstracts of Japan, http://www4.ipdl.inpit.go.jp/Tokujitu/tjsogodben.ipdl?N0000=115, 10 pgs, May 2000.
Machine Translation of Japanese Patent No. JP-2003-500899 available from Patent Abstracts of Japan, http://www4.ipdl.inpit.go.jp/Tokujitu/tjsogodben.ipdl?N0000=115, 17 pgs, Jan. 2003.
Machine Translation of Japanese Patent No. JP-2004-221629 available from Patent Abstracts of Japan, http://www4.ipdl.inpit.go.jp/Tokujitu/tjsogodben.ipdl?N0000=115, 25 pgs, Aug. 2004.
Machine Translation of Japanese Patent No. JP-2001-001570 available from Patent Abstracts of Japan, http://www4.ipdl.inpit.go.jp/Tokujitu/tjsogodben.ipdl?N0000=115, 18 pgs, Jan. 2001.
Machine Translation of Japanese Patent No. JP-2004-094586 available from Patent Abstracts of Japan, http://www4.ipdl.inpit.go.jp/Tokujitu/tjsogodben.ipdl?N0000=115, 11 pgs, Mar. 2004.
Machine Translation of Japanese Patent No. JP-2003-244391, available from Patent Abstracts of Japan, http://www4.ipdl.inpit.go.jp/Tokujitu/tjsogodben.ipdl?N0000=115, 14 pgs, Aug. 2003.
Machine Translation of Japanese Patent No. JP2000-255019 available from Patent Abstracts of Japan, http://www4.ipdl.inpit.go.jp/Tokujitu/tjsogodben.ipdl?N0000=115, 10 pgs, Sep. 2000.
Machine Translation of Japanese Patent No. JP2000-326560, available from Patent Abstracts of Japan, http://www4.ipdl.inpit.go.jp/Tokujitu/tjsogodben.ipdl?N0000=115, 18 pgs, Nov. 2000.
Machine Translation of Japanese Patent No. JP2000-246862, available from Patent Abstracts of Japan, http://www4.ipdl.inpit.go.jp/Tokujitu/tjsogodben.ipdl?N0000=115, 8 pgs, Dec. 2000.
Office action issued Mar. 15, 2011 in Japanese Application No. 2007-536915, 21 pgs., and uncertified translation thereof. (169JP1).
Office action issued Apr. 6, 2011 in European Application No. 05809003.6, 4 pgs. (169EP1.
Office action issued Feb. 3, 2011 in European Application No. 05810626.1, 4 pgs. (167EP1).
Office action issued Mar. 8, 2011 in Japanese Application No. 2007-536914, 12 pgs., and uncertified translation thereof. (170JP1).
Office action issued Mar. 9, 2011 in Chinese Application No. 201010167530.7, 5 pgs, and uncertified translation thereof. (170CN2).
Office action issued Jan. 11, 2011 in Japanese Application No. 2007-536905, 4 pgs., and uncertified translation thereof. (168JP1).
Machine Translation of Japanese Patent No. JPH09-102861, available May 10, 2011 from Patent Abstracts of Japan, http://www4.ipdl.inpit.go.jp/Tokujitu/tjsogodben.ipdl?N0000=115.
Machine Translation of Japanese Patent No. 2002-292935, available May 10, 2011 from Patent Abstracts of Japan, http://www4.ipdl.inpit.go.jp/Tokujitu/tjsogodben.ipdl?N0000=115.
Machine Translation of Japanese Patent No. 2002-171257, available May 10, 2011 from Patent Abstracts of Japan, http://www4.ipdl.inpit.go.jp/Tokujitu/tjsogodben.ipdl?N0000=115.
Machine Translation of Japanese Patent No. H09-058019, available May 10, 2011 from Patent Abstracts of Japan, http://www4.ipdl.inpit.go.jp/Tokujitu/tjsogodben.ipdl?N0000=115.
Machine Translation of Japanese Patent No. JP2004-276394, available May 10, 2011 from Patent Abstracts of Japan, http://www4.ipdl.inpit.go.jp/Tokujitu/tjsogodben.ipdl?N0000=115.
Machine Translation of Japanese Patent No. H06-113143, available May 10, 2011 from Patent Abstracts of Japan, http://www4.ipdl.inpit.go.jp/Tokujitu/tjsogodben.ipdl?N0000=115.
Machine Translation of Japanese Patent No. 09-231035, available May 10, 2011 from Patent Abstracts of Japan, http://www4.ipdl.inpit.go.jp/Tokujitu/tjsogodben.ipdl?N0000=115.
Machine Translation of Japanese Patent No. 2001-334706, available May 10, 2011 from Patent Abstracts of Japan, http://www4.ipdl.inpit.go.jp/Tokujitu/tjsogodben.ipdl?N0000=115.
Machine Translation of Japanese Patent No. 2003-001879, available May 10, 2011 from Patent Abstracts of Japan, http://www4.ipdl.inpit.go.jp/Tokujitu/tjsogodben.ipdl?N0000=115.
Office action issued Jun. 21, 2011 in Japanese Application No. 2007-538968 and uncertified English translation, 6 pgs (181JP1).

Office action issued Jul. 1, 2011 in Chinese Application No. 200580035221.1, awaiting uncertified English translation, 9 pgs (168CN1).

Office action issued Jun. 21, 2011 in Japanese Application No. 2007-536879 and uncertified English translation, 5 pgs (167JP1).

Machine Translation of Japanese Patent No. H11-58891, available Jun. 30, 2011 from Patent Abstracts of Japan.

Machine Translation of Japanese Patent No. 2004-268511, available Jun. 30, 2011 from Patent Abstracts of Japan.

Machine Translation of Japanese Patent No. 200-6389, available Jun. 30, 2011 from Patent Abstracts of Japan.

Machine Translation of Japanese Patent No. 2003-001879, available Jun. 30, 2011 from Patent Abstracts of Japan.

* cited by examiner

PRINTING DEVICE COMMUNICATION PROTOCOL

BACKGROUND

This disclosure relates to protocols for transmitting data, for example, between a computer system and a printing device.

In an industrial printing solution, a printing system typically includes a printing device and a computer system for controlling the printing device. Typically, the printing device and the computer system that controls the printing device are physically separated. Thus, to transfer data to the printing device, the printing system must be designed such that the computer system can reliably communicate with the printing device, and vice versa such that the printing device can communicate with the computer system. To reliably communicate and to provide interoperability between different types of computer systems and different types of printing devices, standards for communication, involving standards for hardware, framing of data packets, and the like may be created. For example, one such standard known as Universal Serial Bus (USB; specification available from USB Implementers Forum, Inc., Portland, Oreg.) has been developed for communicating between a personal computing system and peripheral devices.

SUMMARY

Described herein are methods and apparatus, including computer program products, that relate to protocols for transmitting data, for example, between a computer system and a printing device. In one general aspect, a method of transmitting data between a computer system and an external printing device is provided. That method includes generating a data packet in accordance with a communications protocol, transmitting the data packet from the computer system to the external printing device according to a first layer of the protocol, and decoding the data packet in accordance with a second layer of the protocol. The protocol is defined to includes the first layer defining transmission line, transmitters, and receivers for transmission of the data packet; the second layer defining encoding and decoding of the data packet; and a third layer defining a frame format of the data packet. In that method, generating the data packet includes encoding the data packet according to the second layer of the protocol in a frame format according to the third layer of the protocol.

Implementations may include one or more of the following features. The external printing device may implement the second and third layers of the protocol in an FPGA device. The data packet may be sent in one of two channels, the first being a one-way channel for image data from the computer system to the external printing device, and the second channel being a bidirectional channel for control information. The two channels may be interleaved in a single serial data channel from the computer system to the external printing device.

The first layer may be defined in accordance the first layer of the Fibre Channel Protocol. The first layer may be defined in accordance the first layer of the IEEE 802.3z Gigabit Ethernet Protocol. The second layer may define the encoding and decoding in accordance with the 8B/10B-encoding scheme. The second layer may be defined in accordance with the second layer of the Fibre Channel Protocol. The frame format for the third layer of the protocol may define the data packet to include a start of frame, a data section, and an end of frame. The data section may be defined to include a portion of image data for each print element association at a printing device. The portions of image data may be time-shifted based on a deployment of the print element associations. The data section may be defined to represent one or more printed scan lines, where each printed scan line corresponding to a print element association at the external printing device.

In another aspect, a system includes a computer system with electronics defined in accordance with a first layer of a protocol that has three layers. The computer system is configured to perform operations that include bi-directionally communicating across a first transmission line with an external printing device in accordance with a second and a third layer of the protocol where the first transmission line is configured in accordance with the first layer of the protocol. In the three layers of the protocol, the first layer of the protocol defines transmission line, transmitters, and receivers for transmission of the data packet; the second layer of the protocol defines encoding and decoding of the data packet; and the third layer of the protocol defines a frame format of the data packet.

Implementations may include one or more of the following features. The system may further include the external printing device, where the external printing device implements the second and third layers of the protocol in an FPGA device. The computer system may communicate with the external printing device across one of two channels, the first being a one-way channel for image data from the computer system to the external printing device, and the second channel being a bidirectional channel for control information. The two channels may be interleaved in a single serial data channel from the computer system to the external printing device. The frame format for the third layer of the protocol may define a data packet to include a start of frame, a data section, and an end of frame. The data section may be defined to include a portion of image data for each print element association at the external printing device. The portions of image data are time-shifted based on a deployment of the print element associations. The data section may be defined to represent one or more printed scan lines, such that each printed scan line corresponds to a print element association at the external printing device.

The described print systems and techniques can be implemented to realize one or more of the following advantages. A thin protocol for transmitting data is defined to include three layers. The protocol is "thin" in that the three layers may be defined to omit higher-level transmission services that typically are computationally, time, and/or memory expensive because of the resources they require. Thus, the protocol may facilitate immediate action on transmitted data because of reduced resource requirements. For example, image data may be transmitted just in time for printing (i.e., received by the printing device substantially at the precise instant that the data is to be outputted to a printing mechanism) because only a relatively minimal amount of processing time and resources is required to transmit and receive data. Also, the protocol may include requirements for large bandwidth and lengthy distance (e.g., 2 kilometers). For example, the protocol may be used advantageously in a large industrial printing system that requires large amounts of image data for each scan line that is printed because the bandwidth provided can accommodate the needs of such a system. That protocol may be a modified version of the Fibre Channel Protocol (hereinafter "FCP") or Gigabit Ethernet Protocol (hereinafter "GEP") (IEEE 802.3ae 10 Gigabit Ethernet standard or IEEE 802.3z Gigabit Ethernet Standard), respectively, referred to as a modified FCP (hereinafter "MFCP") or modified GEP (hereinafter "MGEP"). Alternatively, any other suitable protocol may be modified or used. Because the protocol can be adopted from existing standards in the FCP or GEP, off-the shelf components can be used. Also, because a protocol limited to the lower layers of the FCP and GEP require lower resource consumption than the full implementation of the FCP or GEP, a system, such as a printing system, can implement the limited protocol using simpler circuitry, such as an off-the-shelf FPGAs (field programmable gate arrays), instead of typically less economical and more complex computing systems.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
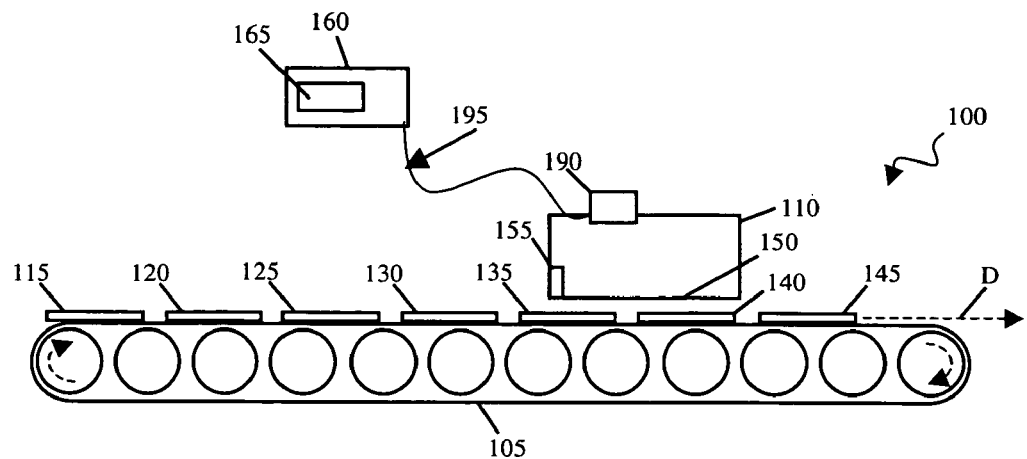
FIG. 1 is a block diagram of a print system.

FIG. 1 is a block diagram of a print system 100. Print system 100 includes a workpiece conveyor 105 and a printer housing 110. Workpiece conveyor 105 produces relative motion between a series of workpieces 115, 120, 125, 130, 135, 140, 145 and printer housing 110. In particular, workpiece conveyor 10 s conveys workpieces 115, 120, 125, 130, 135, 140, 145 in a direction D across a face 150 of printer housing 110. Workpiece conveyor 105 can include a stepper or continuous motor that moves a roller, a belt, or other element that can retain workpieces 115, 120, 125, 130, 135, 140, 145 during conveyance. Workpieces 115, 120, 125, 130, 135, 140, 145 can be any of a number of different substrates upon which system 100 is to print. For example, workpieces 115, 120, 125, 130, 135, 140, 145 can be paper, cardboard, microelectronic devices, or foodstuffs.

Printer housing 110 houses a workpiece detector 155. Workpiece detector 155 can detect the position of one or more workpieces 115, 120, 125, 130, 135, 140, 145. For example, workpiece detector 155 can be a laser/photodetector assembly that detects the passage of edges of workpieces 115, 120, 125, 130, 135, 140, 145 across a certain point on face 150.

Located remotely from the printer housing 110 are control electronics 160. The control electronics 160 interface with the printer housing 110 by a cable 195 (e.g., an optical cable) and minimal electronics 190. Control electronics 160 control the performance of print operations by system 100. Control electronics 160 can include one or more data processing devices that perform operations in accordance with the logic of a set of machine-readable instructions. Control electronics 160 may be, for example, a personal computing system that runs image processing software and software for controlling printing at the printer housing 110.

Located within the control electronics 160 is a print image buffer 165. Print image buffer 165 is one or more data storage devices that store image data for printing by print elements. For example, print image buffer 165 can be a collection of random access memory (RAM) devices. Print image buffer 165 can be accessed by control electronics 160 to store and retrieve image data.

The control electronics 160 interface with the printer housing 110 via the cable 195 and minimal electronics 190. The control electronics 160 can send data across the cable 195, and the minimal electronics 190 can receive that data for printing at the printer housing 110. The control electronics 160 may have special circuitry (e.g., a data pump, as described in more detail in reference to FIG. 10, that can receive and/or retrieve image data from print image buffers, store the image data, and enable print elements at a printing device to receive image data in time to deposit ink on the corresponding image locations on workpieces as they are moving along a conveyor) for generating data to send to the printer housing 110. The minimal electronics 190 may be, for example, a field-programmable gate array that includes a microprocessor, transceiver, and minimal memory. The minimal electronics 190 may be connected to the printer housing 110 such that the minimal electronics 190 can be disconnected easily should the printer housing 110 and/or hardware in the printer housing 110 be changed. For example, if the printer housing 110 is replaced with a newer printer housing containing newer printing modules, the minimal electronics 190 can be disconnected from the older printer housing 110 and connected to the newer printer housing.

The printing of an image is divided between the control electronics 160 and the minimal electronics 190 such that the control electronics performs image processing and controls printing, whereas the minimal electronics 190 receives data received via the cable 195 and uses that data to cause firing of print elements at the printer housing 110. Thus, for example, image data may be converted to jetmap image data, which may include dividing the image data into multiple image queues of image buffers as part of the process of converting to jetmap image data (as described in more detail later); delays may be inserted into image data (e.g., inserting delays corresponding to a deployment of print element associations); and image data may be sent (e.g., encoding data packets of image data and sending by a receiver) at an appropriate time by the control electronics 160; whereas, the minimal electronics 190 may merely receive the image data (e.g., decode image data packets sent across the cable 195) and relay the image data such that the image data is printed on a workpiece (e.g., cause firing of inkjet nozzles according to the image data). The control electronics 160 may synchronize printing of an image at the printer housing 110. Following the previous example, the control electronics 160 may synchronize the printing of an image by receiving an indication of a leading edge of a workpiece and sending image data across the cable 195 to cause the printing of an image at the printer housing 110.

The control electronics 160 can send image data to the printer housing 110 at high data rates to enable "just-in-time" printing of images on the workpieces as the workpieces move along the workpiece conveyor 105. In one implementation of just-in-time printing, transmission of image data to the printer housing 110 can serve as a trigger that causes the image data in a packet to be printed "substantially immediately" as the data arrives at the printer housing 110. In this implementation, the image data may not be stored on a storage component on the printer housing prior to printing the image data, but can be printed as the data arrives at the printer housing. Just-in-time printing may also refer to printing image data substantially at an instant at which the image data arrives at the printer housing.

In another implementation of just-in-time printing, data received at the printer housing is stored in one or more latches, and new or subsequent data that is being received at the printer housing can serve as a trigger to print the latched data. In this implementation, the data received at the printer housing is stored in a latch until the subsequent data arrives at the printer housing, and the subsequent data arriving at the printer housing can serve as a trigger to print the data that has been latched. The data, subsequent data, and latched data may be received and/or stored at the printer housing in the form of an image data packet. In one case, the subsequent data arriving at the printer housing is the next subsequent data. Alternatively, the subsequent data arriving at the printer housing is subsequent data other than the next subsequent data, such as subsequent data arriving after the next subsequent data. Because the image data is being printed at such a high-data rate, the data printed from latched data can also refer to data being printed "substantially immediately" as the data is arriving at the printer housing.

Because the printer housing 110 has minimal electronics 190 and a reduced amount of memory, the printer housing 110 may be implemented at a lower cost. The type of memory used on the printer housing 110 may also be implemented at a lower cost. In one implementation, the type of memory implemented on the printer housing 110 is part of a field-programmable gate array (FPGA) integrated circuit (IC) that may be part of the minimal electronics 190. The costs and engineering design efforts to implement the printer housing 110 may also be reduced due to little or no buffering of high speed image data at the printer housing 110. The system 100 may offer scalable transmission of high bandwidth, synchronous, just-in-time image data to the printer housing 110 in a number of configurations, including, for example, a configuration with multiple FGPAs at the printer housing 110, each of which may implement the minimal electronics 190 and interface with one or more data pumps using one or more cables.

Figure 2:
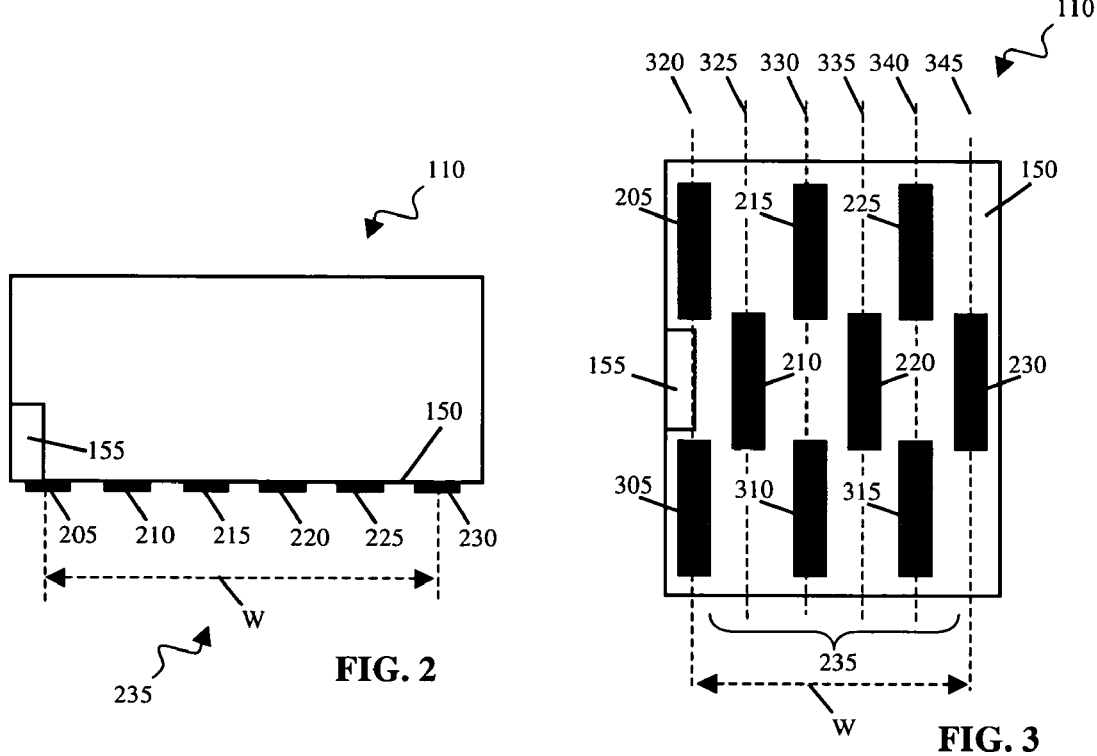
FIGS. 2 and 3 illustrate an arrangement of print modules and print elements in the print system of FIG. 1.
Figure 3:
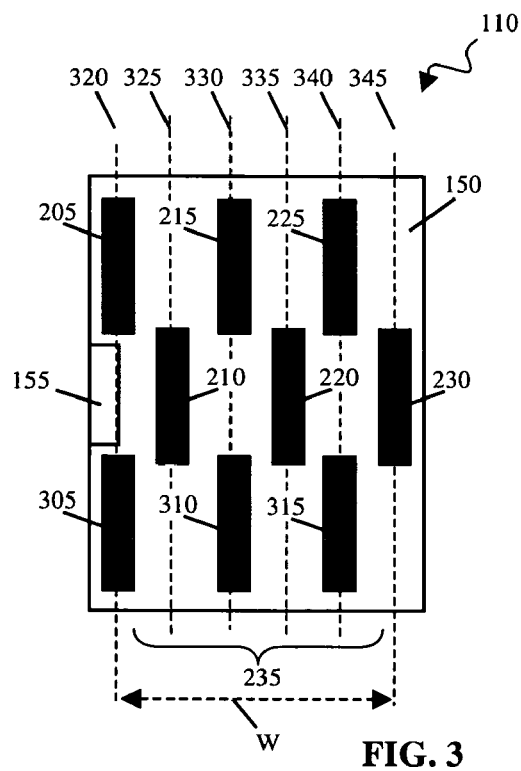

FIGS. 2 and 3 illustrate the arrangement of print modules and print elements on housing 110. In particular, FIG. 2 shows housing 110 from the side, whereas FIG. 3 shows housing 110 from below.

Housing 110 includes a collection of print modules 205, 210, 215, 220, 225, 230, 305, 310, 315 on face 150. Print modules 205, 210, 215, 220, 225, 230, 305, 310, 315 each include one or more print elements. For example, print modules 205, 210, 215, 220, 225, 230, 305, 310, 315 can each include a linear array of inkjet nozzles.

Print modules 205, 305 are arranged laterally along a column 320. Print module 210 is arranged along a column 325. Print modules 215, 310 are arranged laterally along a column 330. Print module 220 is arranged along a column 335. Print modules 225, 315 are arranged laterally along a column 340. Print module 230 is arranged along a column 345. This arrangement of print modules 205, 210, 215, 220, 225, 230, 305, 310, 315 along columns 325, 330, 335, 340, 345 spans an effective print area 235 on face 150. Effective print area 235 has a longitudinal width W that spans from the print elements in print modules 205, 305 to the print elements in print module 230.

Print modules 205, 210, 215, 220, 225, 230, 305, 310, 315 can be deployed in print element associations to print selected components of an image. For example, print modules 205, 210, 305 can be deployed in a first print element association to print a first color across the entire lateral expanse of a substrate moving across face 150, print modules 215, 220, 310 can be deployed in a second print element association to print a second color across the entire lateral expanse, and print modules 225, 230, 315 can be deployed in a third print element association to print a third color across the entire lateral expanse.

As another example, the group of print modules 205, 210, 215, 220, 225, 230, 305, 310, 315 can be deployed in print element associations based on the columnar position of the constituent print elements in the modules. For example, a first print element association can include modules 205, 305 deployed so that their constituent print elements are arranged in a single column. A second print element association can include only print module 210. Modules 215, 310 can form a third association. Associations four, five, and six include modules 220, 225 and 315, and 230, respectively. Forming associations of print elements in this columnar manner allows the printing of back-to-back dissimilar images with variable but small or nonexistent non-printed area between finished image areas, relative to longitudinal width W, without need for complex real-time adjustments in image data.

As another example, the group of print modules 205, 210, 215, 220, 225, 230, 305, 310, 315 can be deployed in print element associations based on the lateral position of the constituent print elements in the modules. For example, a first print element association can include modules 205, 210, 305 deployed so that their constituent print elements are shifted in lateral position relative to the print elements in modules 215, 220, 310 and to the print elements in modules 225, 230, 315. A second print element association can include print modules 215, 220, 310 deployed so that their constituent print elements are shifted in lateral position relative to the print elements in modules 205, 210, 305 and to the print elements in modules 225, 230, 315. Modules 225, 230, 315 can form a third association. The relative shifts in position can be smaller than the lateral spacing of the print elements in the modules to, in net effect, decrease the lateral spacing between print elements on housing 110 and thereby effectively increase the resolution at which an image can be printed.

As another example, groups of print modules can be deployed in print element associations based on the lateral expanses covered by the print modules. For example, a first print element association can include modules 205, 305, 215, 310, 225, 315 deployed to cover the laterally outer expanses of a workpiece. A second print element association can include print modules 210, 220, 230 deployed to cover the laterally central expanses of a workpiece.

As another example, groups of print elements can be deployed in print element associations based on a combination of these and other factors. For example, groups of print elements can be deployed in a print element association based on their printing the color cyan on an outer extent of a workpiece. As another example, groups of print modules can be deployed in a print element association based on their constituent print elements printing at certain lateral positions on the laterally outer expanses of a workpiece.

Each print element association can have a dedicated memory location in print image buffer 165 (shown in FIG. 1) in that the association prints image data that once resided in the memory location. For example, when print image buffer 165 is a collection of queues of individual buffers, each print element association can have an individual, dedicated queue of buffers.

Figure 4:
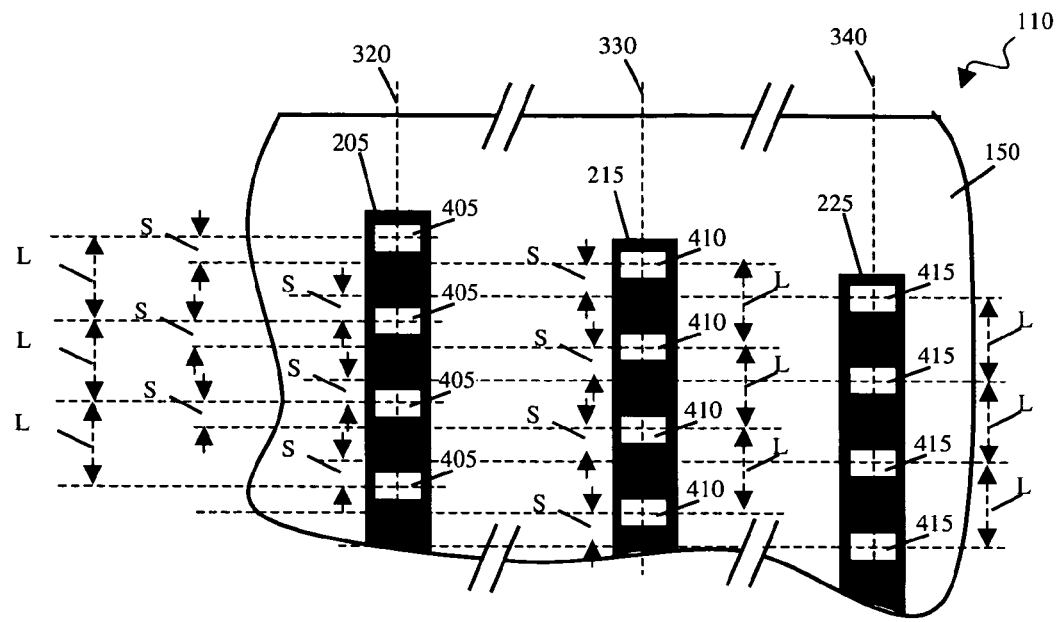
FIG. 4 schematically illustrates the deployment of print elements with relative shifts in lateral position.

FIG. 4 schematically illustrates a deployment of print elements with relative shifts in lateral position. The illustrated portion of housing 110 includes print modules 205, 215, 225. Print module 205 includes an array of print elements 405 laterally separated from one another by a distance L. Print module 215 includes an array of print elements 410 laterally separated from one another by a distance L. Print module 225 includes an array of print elements 415 laterally separated from one another by a distance L.

Print elements 405 are shifted relative to the lateral position of print elements 410 by a shift distance S. Print elements 405 are shifted relative to the lateral position of print elements 415 by shift distance S. Print elements 410 are shifted relative to the lateral position of print elements 415 by shift distance S. Shift distance S is smaller than distance L, and the net effect of the relative lateral shifts between print elements 405, print elements 410, and print elements 415 is to decrease the overall lateral spacing between print elements on face 150 of housing 110.

Figure 5:
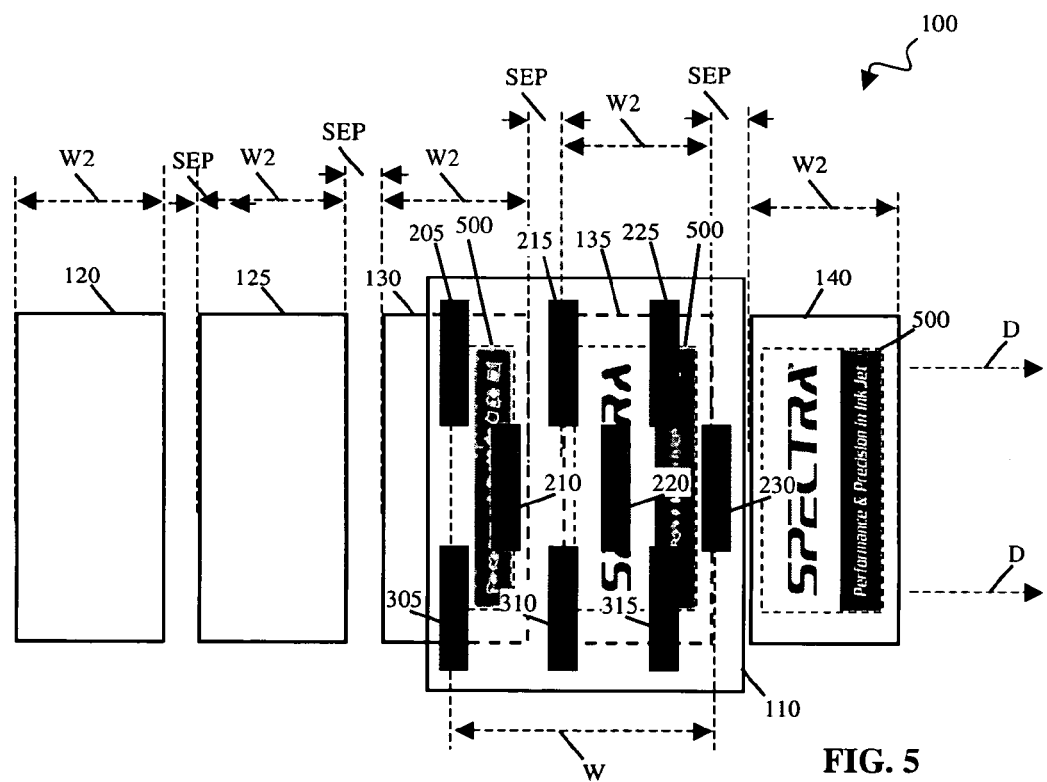
FIG. 5 schematically illustrates the serial printing of an image on different workpieces.

FIG. 5 schematically illustrates the serial printing of an image 500 on two or more different workpieces using print system 100. A series of workpieces 120, 125, 130, 135, 140 is conveyed across effective print area 235 on face 150 of printer housing 110 for printing. Image 500 can be serially printed in that image 500 can be printed sequentially on workpieces 120, 125, 130, 135, 140 (i.e., the same image is printed, in succession, on various workpieces).

Workpieces 120, 125, 130, 135, 140 each have a longitudinal width W2. Workpiece width W2 is smaller than width W of effective print area 235. A leading edge of workpiece 120 is separated from a trailing edge of workpiece 125 by separation distance SEP. A leading edge of workpiece 125 is separated from a trailing edge of workpiece 130 by separation distance SEP. A leading edge of workpiece 130 is separated from a trailing edge of workpiece 135 by separation distance SEP. A leading edge of workpiece 135 is separated from a trailing edge of workpiece 140 by separation distance SEP. The separation distance SEP may be smaller than width W of effective print area 235. The separation distance SEP may be zero. As such, both workpiece 130 and workpiece 135 may be positioned in effective print area 235 simultaneously and be printed on at the same time.

System 100 has partially printed image 500 on both workpiece 130 and workpiece 135. Such serial printing of image 500 on two or more different workpieces using a single effective print area speeds the throughput of workpieces in system 100.

Figure 6:
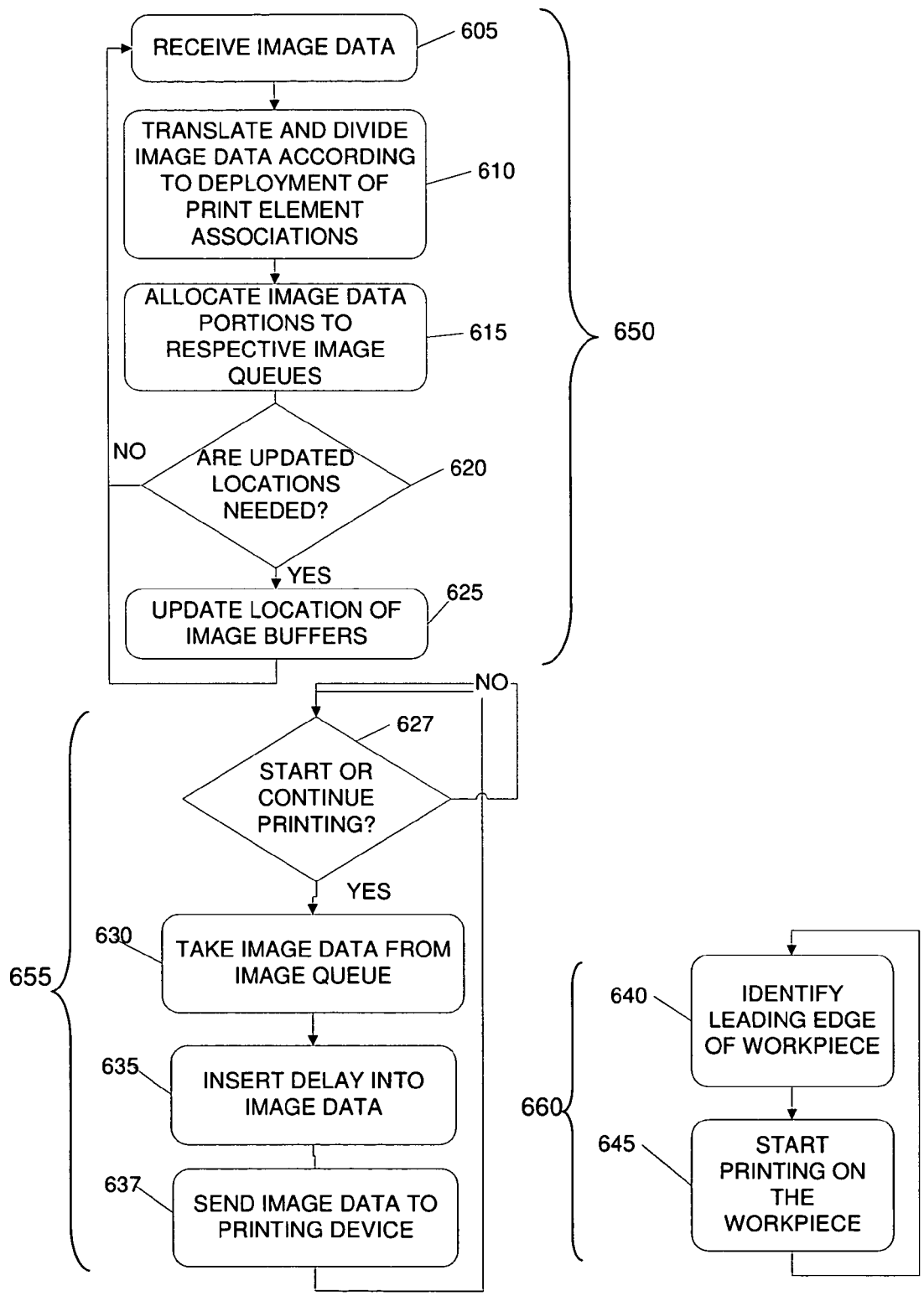
FIG. 6 includes flowcharts of processes for the serial printing of an image on different workpieces.

FIG. 6 includes flowcharts of processes 650, 655, 660 for the serial printing of an image on two or more different workpieces using a single effective print area. Processes 650, 655, 660 can be performed in whole or in part by a data processing apparatus and/or circuitry configured to exchange data with a buffer and control printing by print elements. In system 100, processes 650, 655, 660 can be performed by control electronics 160 using input received from workpiece conveyor 105 and workpiece detector 155. Within the control electronics 160, different processes may be performed by different parts of the system 100. For example, the process 650 may be performed by software operating in the control electronics 160 and the processes 655 and 660 may be performed by a data pump. The processes of 650, 655, and 660 are separate to indicate that they can be performed concurrently and/or independently of each other.

The system performing the process 650 receives image data at 605. The image data can be a stand-alone collection of data regarding an individual image. For example, the image data can be a graphic image format (gif) file, a joint photographic experts group (jpeg) file, PostScript, Printer Command Language (PCL), or other image data collection.

The system can then translate and divide the received image data according to a deployment of associated print elements at 610. The image data can be translated before it is divided, divided before it is translated, or translated and divided as part of the same process. The translation of image data can include, for example, a conversion of image data into a format understandable by a printing device, such as bitmap raster data, and a further conversion of the bitmap raster data into jetmap data. Converting bitmap raster image data into jetmap data involves taking an input bitmap, which is arranged in an order corresponding to a geographic order used by the bitmap image format, and rearranging the bitmap raster image data to correspond to physical locations of the print elements. It may also involve dividing the image data as part of the process of converting the bitmap raster image data to jetmap data (i.e., the jetmap data is divided into image buffers corresponding print element associations). As an example, the process at 610 may include converting jpeg formatted image data to bitmap formatted image data, and then converting the bitmap formatted image data into jetmap image data as image buffers corresponding to print element associations. In an alternative implementation, image data may be converted directly to jetmap data without first converting to an intermediary format.

The division of image data according to the deployment of associated print elements can include the identification of portions of the image data that are to be printed by an association of print elements based on the deployment of the association.

Figure 7:
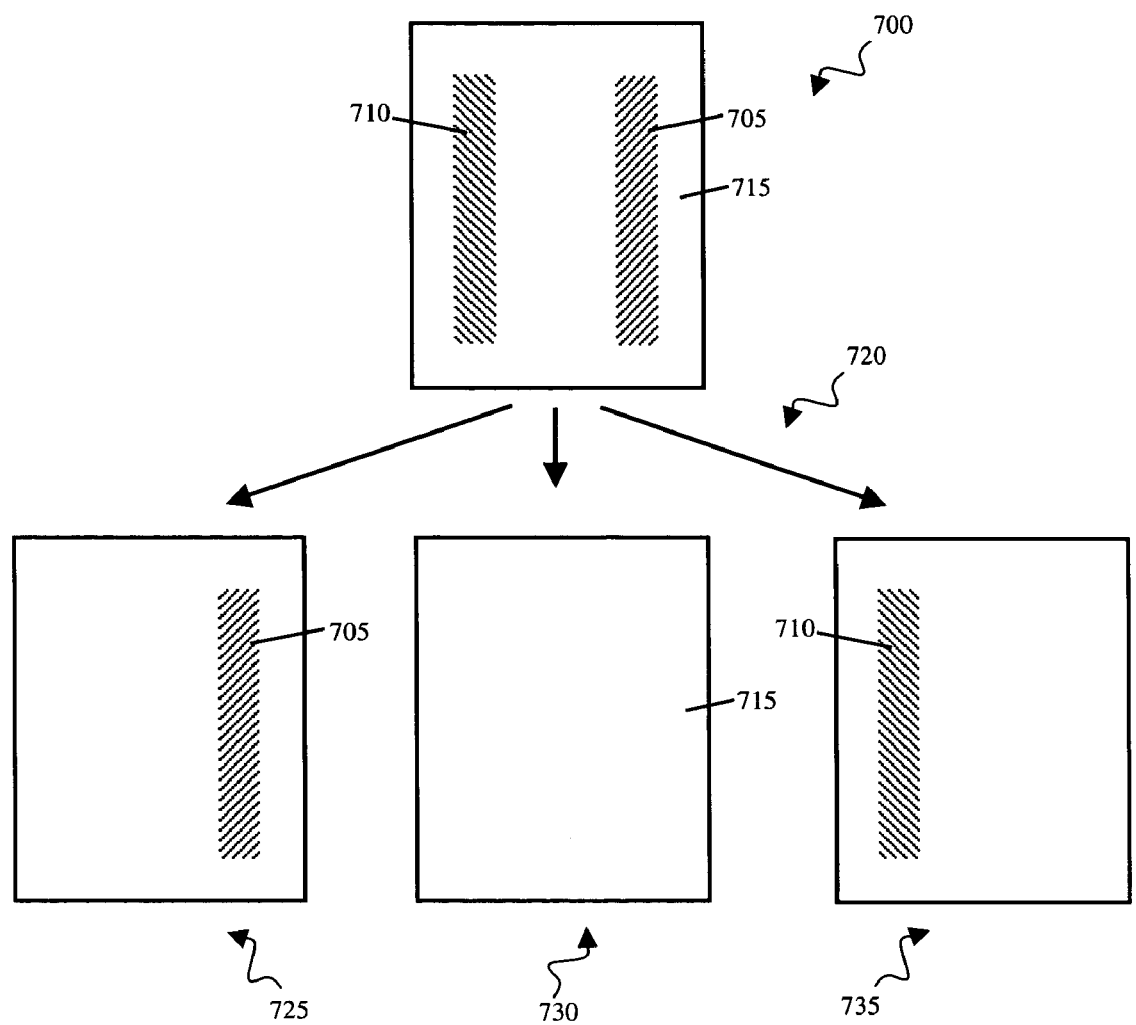
FIGS. 7, 8, and 9 illustrate implementations of a division of image data according to a deployment of print element associations.

FIG. 7 illustrates one implementation of the division of image data representing an image 700 according to a deployment of print element associations. Image 700 includes a cyan line 705, a magenta line 710, and a yellow line 715. Cyan line 705 is printable by an association of print elements deployed to print cyan. Magenta line 710 is printable by an association of print elements deployed to print magenta. Yellow line 715 is printable by an association of print elements deployed to print yellow.

When the image data representing image 700 is divided (indicated by arrows 720), three individual collections of data representing images 725, 730, 735 are formed. Image 725 includes cyan line 705 and is thus printable by an association of print elements deployed to print cyan. Image 730 includes yellow line 715 and is thus printable by an association of print elements deployed to print yellow. Image 735 includes magenta line 710 and is thus printable by an association of print elements deployed to print magenta. Thus, the image data representing images 725, 730, 735 are the result of a division of data representing image 700 according to the deployment of associations of print elements to print different colors.

Figure 8:
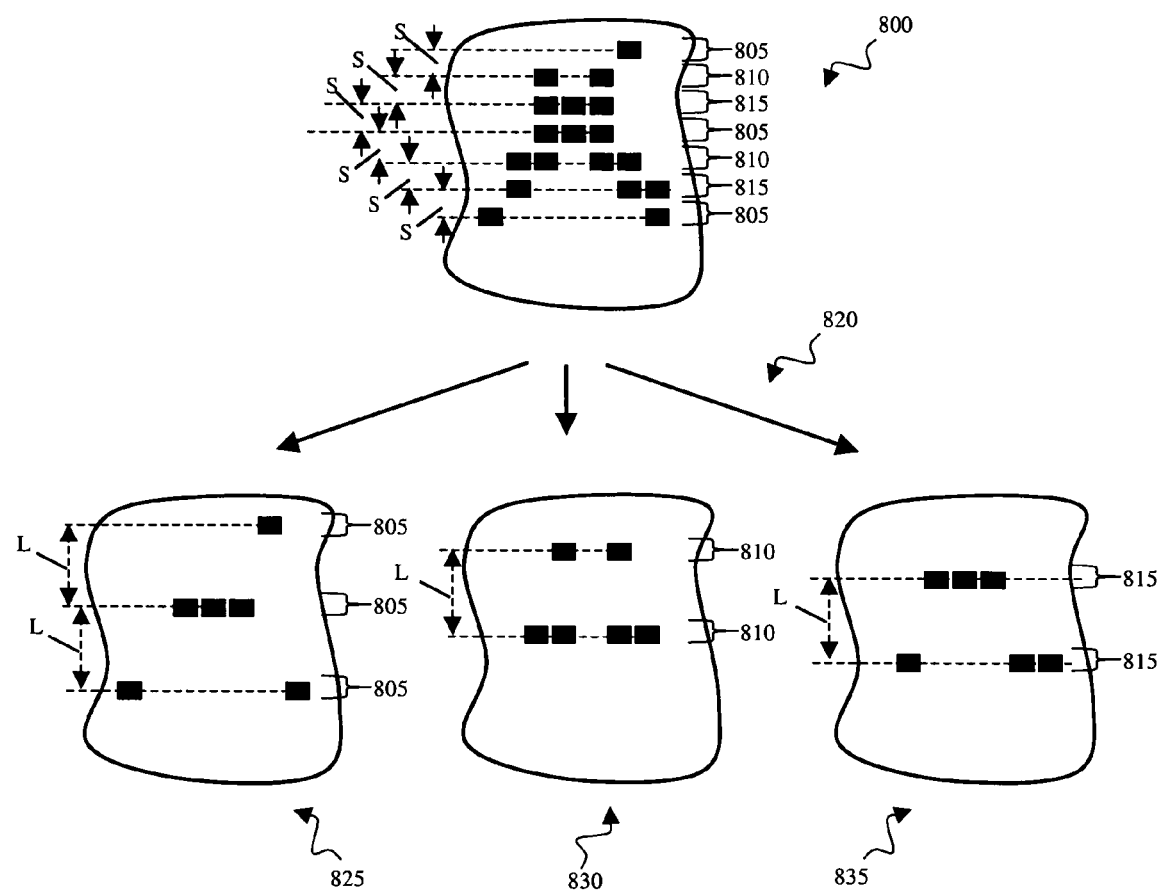

FIG. 8 illustrates another implementation of the division of image data (namely, image data representing a portion of an image 800) according to a deployment of print element associations. In particular, a division according to a deployment of print elements with relative shifts in lateral position is illustrated. The shifts in the lateral position of print elements can correspond to the lateral shifts S between print elements 405, print elements 410, and print elements 415 in the implementation of housing 110 shown in FIG. 4.

Image portion 800 includes collections of pixel rows 805, 810, 815. Pixel rows 805, 810, 815 each include a longitudinal row of pixels. Pixel rows 805 are laterally shifted relative to the position of pixel rows 810 by a shift distance S. Pixel rows 805 are laterally shifted relative to the position of pixel rows 815 by shift distance S. Pixel rows 810 are laterally shifted relative to the position of pixel rows 815 by shift distance S. Shift distance S (and hence the lateral resolution of the printed imaged) is determined by the overall lateral spacing between print elements.

When a workpiece is moved longitudinally across an array of print elements, each pixel row 805, 810, 815 can be printed by an individual print element. For example, when image portion 800 is printed using the implementation of housing 110 shown in FIG. 4, a single print element 405 can print a single pixel row 805, a single print element 410 can print a single pixel row 810, and a single print element 415 can print a single pixel row 815.

When the image data representing image portion 800 is divided (indicated by arrows 820), three individual collections of data representing image portions 825, 830, 835 are formed. Image portion 825 includes pixel rows 805 and is thus printable by a first array of print elements separated by a lateral distance L. Image portion 830 includes pixel rows 810 and is thus printable by a second array of print elements separated by a lateral distance L. Image portion 835 includes pixel rows 815 and is thus printable by a third array of print elements separated by a lateral distance L. The print elements in these arrays are shifted in lateral position relative to one another. Thus, the image data representing image portions 825, 830, 835 are the result of a division of data representing image portion 800 according to the deployment of associations of print elements to print at different lateral positions.

Figure 9:
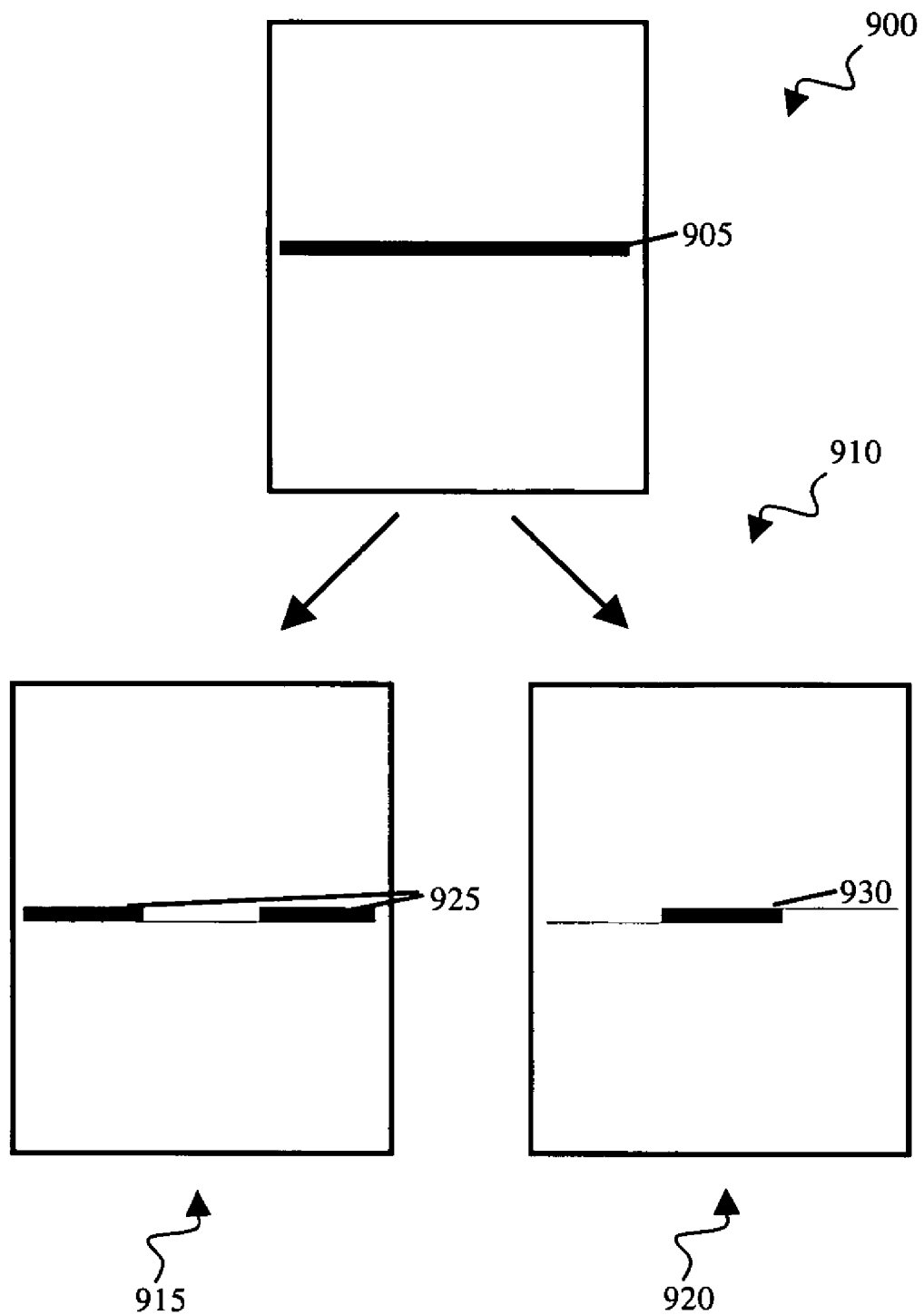

FIG. 9 illustrates another implementation of a division of image data representing an image 900 according to a deployment of print element associations. Image 900 includes a single line 905 that spans the entire lateral expanse of image 900.

When the image data representing image 900 is divided (indicated by arrows 910), two individual collections of data representing images 915, 920 are formed. Image 915 includes two outer line portions 925 and is thus printable by an association of print elements deployed toward the outside of a workpiece. For example, outer line portions 925 may be printable by an association that includes print modules 205, 305, by an association that includes print modules 215, 310, or by an association that includes print modules 225, 315 (FIG. 3).

Image 920 includes a central line portion 930 and is thus printable by an association of print elements deployed toward the center of a workpiece. For example, central line portion 930 may be printable by an association that includes print module 210, by an association that includes print module 220, or by an association that includes print module 230 (FIG. 3). Thus, the image data representing images 915, 920 are the result of a division of data representing image 900 according to the deployment of associations of print elements to print different lateral expanses.

Returning to FIG. 6, the system performing process 650 allocates the image data portions that result from a division to respective image queues at 615. In other words, the allocation results in each buffer of image data being allocated to a respective queue. In general, each buffer of image data corresponds to an association of print elements at a printing device. Similarly, a set of buffers corresponds to a set of image data to be printed by the print element associations. The buffers of image data, which were generated at 610, are queued in queues, with each queue corresponding to a print element association. For example, if there are eight image queues, each image queue corresponding to a print element association, then a set of buffers of image data that correspond to the first print element association may be allocated to the first image queue, a set of buffers of image data that correspond to the second print element association may be allocated to the second image queue, and so on. The memory locations where the image queues and the buffers are located can be dedicated to the storage of image data for printing by a specific print element association. For example, the memory locations may be blocked off from memory management by an operating system and the memory locations may be accessible by a data pump using direct memory access. The queues for the buffers of image data may be first in first out queues (i.e., FIFO queues).

At 620, the system performing process 650 determines whether the system should update the locations indicating where the print image buffers (i.e., buffers of image data) are located. For example, the system might update locations at one or more data pumps. In that example, the data pumps can store a location indicating where print buffers are located at each of the image queues so the data pumps are able to access each of the memory devices where the buffers are located and retrieve image data. If, at 620, the system determines that the locations should be updated, the locations are updated with references to the buffers at 625. Otherwise, image data is received at 605 and the process continues. Also, the process continues at 605 if updated locations are not needed at 620. In some implementations, the process of 650 may stop, for example, if there are no more images to receive (e.g., no more images to print), or if the image queues are full.

A determination is made as to whether printing should start or continue at 627. If not, the process continues at 627. If so, at 630, image data may be retrieved from buffers in the image queues. For example, a data pump may retrieve buffers of image data. In that example, the data pump is able to identify the proper buffers because the locations of the buffers may be updated at the data pump at 625. A sufficient amount of image data for one impression of an association of print elements may be retrieved. Thus, image data may be retrieved from each of the image queues. In alternative implementations, portions of image data representing a portion of a single impression may be retrieved. Similarly, portions of image data representing several impressions may be retrieved. In those implementations, a queue, such as a FIFO queue, may store image data (e.g., sets of buffers of image data).

At 635, positional delays are added to selected portions of image data. The delays are upfront delays that align image data with the associations of print elements to which respective portions of image data correspond. Thus, the extent of the upfront delay can be determined based on the deployment of the print element association to which image data corresponds. For example, a minimal positional delay or no delay at all may be inserted into image data that corresponds to a print element association near the entry of workpieces across an effective print area, whereas a larger positional delay may be inserted into image data that corresponds to a print element association near the exit of workpieces across an effective print area. Because the positional delays correspond to the position of print element associations (or rather, the separation distance between print element associations), the positional delays may differ depending on a type of print head assembly that contains the print element associations. In any case, the positional delays may be a fixed delay(s) for a particular print head assembly and the delays may be measured in an amount corresponding to an amount of print lines.

Inserting an upfront delay into image data can be performed in a number of different ways. For example, an appropriate amount of null "placeholder" data can be inserted before and after the image data portions that result from a division of image data. As another example, the upfront delay can be introduced into a data communication path between a memory location and print elements. For example, a data pump may be aligned such that the data pump can insert different upfront delays for different portions of image data at different memory locations. Image data with delays may be sent to a printing device at 637. In alternative implementations, image data with delays may be added to a queue (e.g., a first in first out queue) prior to sending the data to a printing device. The process at 655 may continue at the process of 627 after image data is sent at 637. In some implementations, the process at 655 may stop after image data is sent at 637 for various reasons. For example, if all image data packets have been sent by a data pump, the data pump may determine at 627 that the system should no longer be printing (i.e., determine not to start or continue printing). In some implementations, empty data image packets may be sent, effectively causing no ink to be deposited on a workpiece.

The system can identify the entry of a leading edge of a workpiece to an effective print area of a print system at 640. The entry of the leading edge can be identified using a workpiece detector (such as workpiece detector 155 (FIG. 1)). The further progress of the workpiece across the effective print area can be followed by sensing the speed of the workpiece, e.g., by measuring the speed of a workpiece conveyor (such as workpiece conveyor 105 (FIG. 1)) using a rolling encoder.

When the workpiece is appropriately positioned, the print system performing process 660 can commence printing of the workpiece at 645. The printing of the workpiece can include relaying image data that has been divided according to the deployment of the print element association. The image data can be relayed from a memory location to the appropriate print element association. The relaying can be driven by a central data processing device, such as a central data processing device in control electronics 160. The relaying can be done on a firing-by-firing basis. In the processes shown in the flowcharts of FIG. 6, a signal may be sent to the system performing the process of 655 (e.g., a data pump) to start printing, causing a relaying of image data to a printing device.

As the workpiece moves across the effective print area, different print elements can be triggered by the same trigger signal to fire at the same instant. Alternatively, different print elements can be staggered to fire at different instants. Regardless of when the actual firing of individual elements occurs, the elements in the effective print area are printing on the initial workpiece at the same time.

In a print system where the effective print area has a longitudinal width that is greater than the separation distance to the next workpiece, one or more workpieces may be positioned beneath the effective print area at the same time. As such, more than one workpiece may be available for serial printing. One example of this situation is illustrated in FIG. 5, where the separation distance SEP between workpieces is smaller than width W of effective print area 235, and, both workpiece 130 and workpiece 135 are positioned beneath effective print area 235 and available to be printed in series.

In such a print system, the system performing process 660 can also identify the entry of the leading edge of a next workpiece at 640. The entry of the leading edge can be identified using a workpiece detector (such as workpiece detector 155 (FIG. 1)). The progress of both an initial workpiece and the next workpiece across the effective print area can be followed by sensing the speed of the workpieces, e.g., by measuring the speed of a workpiece conveyor (such as workpiece conveyor 105 (FIG. 1)).

Printing on both workpieces can continue as the initial workpiece and the next workpiece continue to progress across the effective print area. When the effective print area has a longitudinal width that is greater than the sum of the width of a next workpiece and twice the separation distance between workpieces, an initial workpiece, the next workpiece, and yet another workpiece may be positioned beneath the effective print area at the same time. As such, three workpieces may be available for printing in series. In this case, the system performing process 660 can identify the leading edge of another "next workpiece" at 640 before stopping printing on an initial workpiece. Otherwise, the system can stop printing on the initial workpiece before identifying the leading edge of another "next workpiece" at 640.

In some implementations, image data may be divided based on associations of print modules. In some implementations, print element associations may be split across a single print module. For example, if each print module in a print system includes two rows of print elements, image data may be divided by the rows of print elements. Thus, a space between workpieces may be reduced to zero.

In some implementations, the system(s) performing processes shown in FIG. 6 can calculate the positional delay required between print element associations (rather than having a fixed delay). The memory locations can be dedicated to specific print element associations. For example, individual buffers can store image data for printing by individual print element associations. The system performing processes shown in FIG. 6 can control a data pump or other hardware device to extract data from memory locations at the appropriate point in time to properly place image data on a workpiece on which the image data is to be printed.

Although the processes of FIG. 6 are shown as being composed of a certain number and type of processes, additional and/or different processes can be used instead. For example, in the process of 655, rather than continually determining whether to continue or start printing at 627, the system performing the process of 655 may start printing when started and stop printing when the system decides to stop printing, only to start printing when called on again. Similarly, the processes need not be performed in the order depicted, or by the components that were discussed to have performed certain processes.

Figure 10:
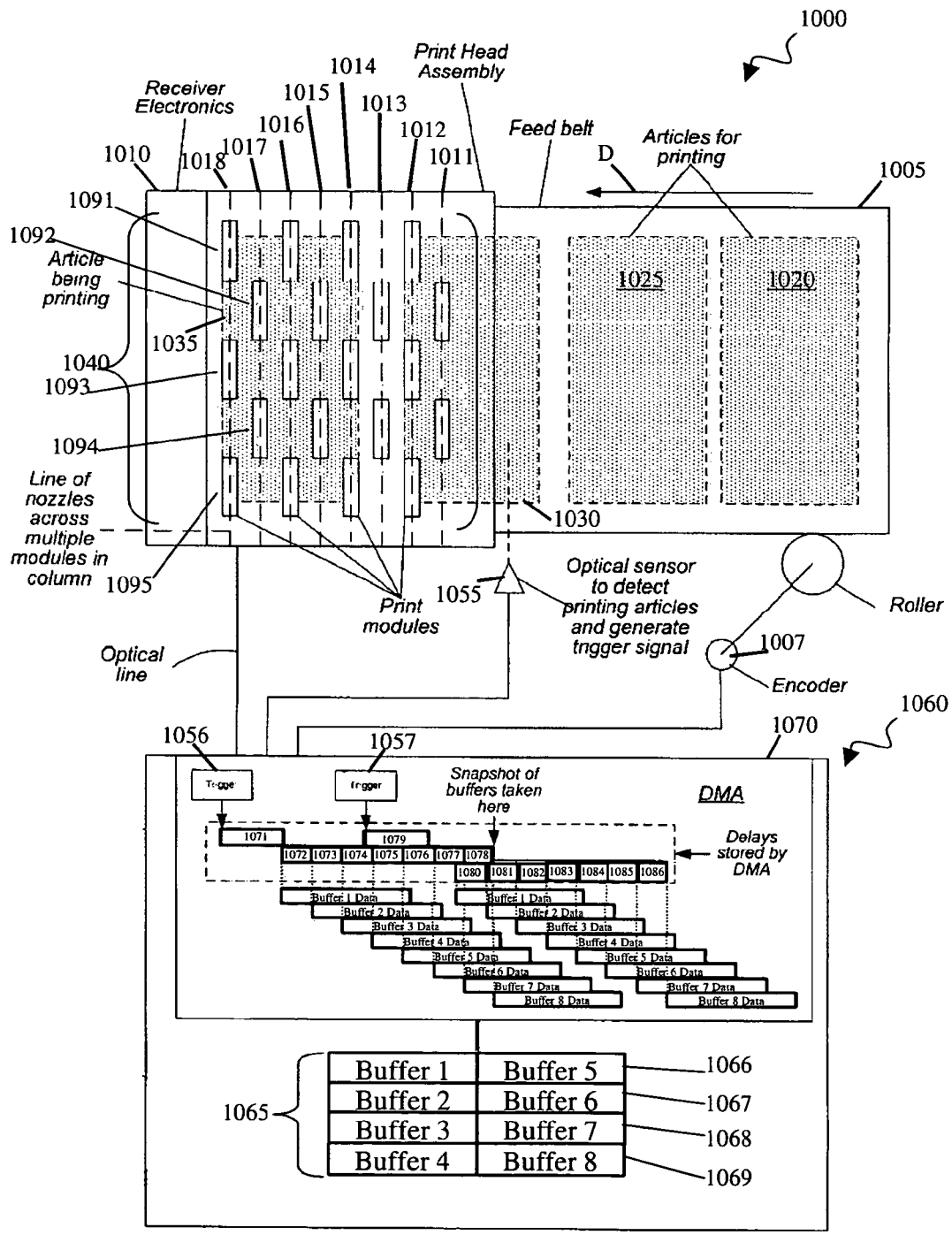
FIG. 10 shows a schematic representation of an implementation of a print system.

FIG. 10 shows a schematic representation of an implementation of a print system 1000. System 1000 includes workpiece conveyor 1005, a printer housing 1010, a, workpiece detector 1055, and control electronics 1060.

Workpiece conveyor 1005 conveys workpieces 1020, 1025, 1030, 1035 in a direction D across an effective print area 1040 of printer housing 1010. Workpiece conveyor 1005 includes an encoder 1007 that senses the speed of workpieces 1020, 1025, 1030, 1035. Encoder 1007 also generates a signal that encodes the sensed speed and relays the signal to control electronics 1060. Workpiece detector 1055 is an optical sensor that detects the position of one or more workpieces 1020, 1025, 1030, 1035, and generates trigger signals (such as trigger signals 1056 and 1057) based upon that detection.

Printer housing 1010 includes a collection of print modules arranged laterally along a series of columns 1011, 1012, 1013, 1014, 1015, 1016, 1017, 1018. This arrangement of print modules spans an effective print area 1040. Each group of print modules deployed along each of columns 1011, 1012, 1013, 1014, 1015, 1016, 1017, 1018 constitutes a print element association. As examples, print modules 1091, 1093, 1095 constitute a print element association along column 1018, and print modules 1092, 1094 constitute a print element association along column 1017.

Control electronics 1060 controls the performance of print operations by system 1000. Control electronics 1060 includes a collection of print image buffers 1065. Control electronics 1060 can access the print image buffers in collection 1065 to store and retrieve image data. In the configuration shown in FIG. 10, there are eight print image buffers in collection 1065, and each print image buffer is dedicated to a print element association arranged along one of columns 1011, 1012, 1013, 1014, 1015, 1016, 1017, 1018. For example, print image buffers 1066, 1067, 1068, 1069 may correspond to the print element associations arranged along columns 1015, 1016, 1017, 1018, respectively. In particular, each print element association prints image data only from the associated print image buffer.

Control electronics 1060 also includes a data pump 1070. A "data pump" refers to a functional component, e.g., implemented in hardware, software, programmable logic or a combination thereof, that processes data and transmits it to one or more printing devices for printing. In one implementation, the data pump can refer to a direct memory access (DMA) device. The data pump 1070 is positioned along the data communication path between the print element associations and their dedicated print image buffers in collection 1065. The data pump 1070 can receive and store image data from each print image buffer in collection 1065. The data pump 1070 is programmable by control electronics 1060 to delay the communication of information from the print image buffers in collection 1065 to the print element associations.

In operation, control electronics 1060 can divide image data according to the deployment of print element associations in effective print area 1040. Control electronics 1060 can also allocate the divided image data to an appropriate print image buffer in collection 1065.

As workpiece 1035 is conveyed by workpiece conveyor 1005 to enter effective print area 1040, workpiece detector 1055 detects the leading edge of workpiece 1035 and generates trigger signal 1056. Based on receipt of trigger signal 1056, control electronics 1060 can program data pumps 1070 with positional delays 1071, 1072, 1073, 1074, 1075, 1076, 1077, 1078. Delay 1071 delays the communication of image data from a first print image buffer in collection 1065 to the print element association arranged along column 1011. Delay 1072 delays the communication of image data from a second print image buffer in collection 1065 to the print element association arranged along column 1012. Delays 1073, 1074, 1075, 1076, 1077, 1078 delay the communication of image data from respective print image buffers in collection 1065 to the print element associations arranged along columns 1013, 1014, 1015, 1016, 1017, 1018.

As workpiece 1035 is conveyed by workpiece conveyor 1005 across effective print area 1040, the print element associations arranged along columns 1011, 1012, 1013, 1014, 1015, 1016, 1017, 1018 successively print. In particular, as workpiece 1035 is advanced one scan line across effective print area 1040, the data pump 1070 dumps image data to the appropriate receiver electronics at the print element associations arranged along columns 1011, 1012, 1013, 1014, 1015, 1016, 1017, 1018 (i.e., the data pump 1070 causes the image data to be transmitted to the printing device). The dumped image data identifies print elements that are to fire for the instantaneous position of workpiece 1035 in effective print area 1040 (the identification of print elements may be implicit; e.g., an ordering of image data in a data packet in a format corresponding to an order of print elements and/or print element associations at a printing device). Data for successive firings can be loaded from print image buffers in collection 1065 to the data pump 1070 during firings.

While workpiece 1035 is still being printed, workpiece 1030 can be conveyed by workpiece conveyor 1005 to enter effective print area 1040. Workpiece detector 1055 detects the leading edge of workpiece 1030 and generates trigger signal 1057. Based on receipt of trigger signal 1057, control electronics 1060 may cause the data pump 1070 to insert delays 1079, 1080, 1081, 1082, 1083, 1084, 1085, 1086. Delay 1079 delays the communication of image data from a first print image buffer in collection 1065 to the print element association arranged along column 1011. Delay 1080 delays the communication of image data from a second print image buffer in collection 1065 to the print element association arranged along column 1012. Delays 1081, 1082, 1083, 1084, 1085, 1086 delay the communication of image data from respective print image buffers in collection 1065 to the print element associations arranged along columns 1013, 1014, 1015, 1016, 1017, 1018. Alternatively, delays may already be inserted into image data and the trigger signal may cause the sending of image data by the data pump 1070.

As workpiece 1030 is conveyed by workpiece conveyor 1005 into effective print area 1040, the print element associations arranged along columns 1011, 1012, 1013, 1014, 1015, 1016, 1017, 1018 print upon workpieces 1030, 1025. In particular, as workpieces 1035, 1030 are advanced one scan line, the data pump 1070 dumps image data to the appropriate receiver electronics for the print element and workpieces 1035, 1030 are printed at the same time.

Image data for each workpiece may differ. For example, if two workpieces were to have two different images printed upon them, different image data representing different images would be used to print on each workpiece. In that example, two sets of image data may be gathered at a data pump. A first set of image data may correspond to a first image (e.g., a print line of an image of a frog) and a second set of image data may correspond to a second image (e.g., three print lines of an image of an apple). Gathering the image data may include taking image data from image queues and/or generating a data packet that includes the first and second sets of image data. The gathered image data may be provided to the print element associations by sending a data packet to the printing device that includes the print element associations (e.g., a data packet including the print line of the image of the frog and the three print lines of the image of the apple). When the two workpieces are printed at substantially the same time, a first portion of the print buffers (e.g., print buffer 1066) may store the first set of image data corresponding to the first image (e.g., the print line of the image of the frog) and a second portion of the print buffers (e.g., print buffers 1067, 1068, 1069) may store the second set of image data corresponding to the second image (e.g., the three print lines of the image of the apple). A first set of print elements corresponding to the first set of print buffers (e.g., the print elements in the association of print elements along column 1015) can print the first image (e.g., the print line of the image of the frog) and a second set of print elements corresponding to the second set of buffers (e.g., the print elements in the associations of print elements along columns 1016, 1017, 1018) can print the second image (e.g., the three print lines of the image of the apple). As such, different print elements print two images at substantially a same time (e.g., print elements along the columns 1015, 1016, 1017, 1018 may fire at substantially a same time).

Or, the image data for each workspace may represent the same image. For example, the same image may be continually printed on multiple workpieces. In that example, if two workpieces are printed at substantially a same time, different portions of the same image may reside in different sets of print buffers such that different print elements print different portions of the same image.

Although not shown, in addition to using different sets of print elements to print different portions of image data on different workpieces, a same workpiece may be printed on with different sets of image data.

Protocol for Transmitting Data

Data (e.g., image data defining a print scan line) may be transmitted between a first device, such as a computer system (e.g., control electronics 1060) and a printing device (e.g., control electronics at the printer housing 1010) in accordance with a protocol described herein. In general, the protocol defines a point-to-point bi-directional data channel through which data is transmitted in data packets. The protocol includes three layers, each of which defines different aspects of transmission of data. The first layer defines physical aspects of transmission of a data packet, the second layer defines encoding and decoding of a data packet, and the third layer defines a frame format of a data packet. Each of the layers is designed such that hardware and/or software designed for any layer of the protocol can be interchanged with different types of hardware and/or software for other layers of the protocol. For example, a transmission line designed for the first layer of the protocol may be matched with different types of encoding and decoding hardware that is designed in accordance with the second layer of the protocol. To provide this interoperability, the interface between layers may be adapted accordingly.

The first layer of the protocol defines physical aspects of transmission of a data packet. These aspects include media, transmitters, receivers, various speeds of transmission, and distances for transmission. Thus, the first layer of the protocol can define all aspects related to transmission that occur from the input of one transmitter to clock recovered output from an associated receiver (i.e., output from a receiver that is retimed to a clock on the receiver-side).

Aspects related to media defined by the protocol include types of acceptable interfaces between devices. Acceptable interface types include optical fiber, differential and/or twisted pair, and coaxial cable. The protocol defines, for each interface, types of physical connectors (i.e., dimensions of a plug and/or receiver of a plug) and types of acceptable transmission line (i.e., transmission media) that link connectors. The protocol defines a logical "1" depending on the types of media. For example, a logical "1" can be coded for optical power as the state with more optical power; for coaxial media as the state where the center conductor (with respect to the shield) is more positive; and for shielded twisted pair as the state where a conductor pin identified as "+" is more positive than a conductor pin identified as "−". In addition, the protocol defines that transmission takes place on a transmitting line and a receiving line, included in a single transmission line. For example, one transmission line may include one serial data communication line for transmitting data from a computer system to a printing device and a second serial data communication line for transmitting data from the printing device to the computer system.

Aspects related to the transmitters and receivers are defined by the first layer of the protocol. The protocol defines transmitters to be controlled by the second layer of the protocol and to be operative to convert serial data received from that level into the proper signal types associated with the transmission media (i.e., encoded data is converted to signals for communication). The protocol defines receivers to be controlled by the second layer of the protocol and to be operative to convert incoming data from a form required by a transmission media employed, retime the received data, and present the data to the second layer of the protocol (e.g., for decoding). In addition, the protocol may define certain states for the transmitter such as a transmitter not-enabled state, a transmitter enabled state, a transition between the not enabled and enabled states, and/or a transmitter failure state. These states may be used by higher levels of the protocol, such as the second layer, to understand the status of the transmitter and properly control transmission of data. By contrast, the protocol may define that the receiver has no states.

The protocol may define that several data rates can be supported, including 1.25 gigabits per a second, and depending on a data rate that is used, the protocol may define a corresponding range of distance that should be supported (e.g., from 0 to 10 kilometers).

Although certain physical aspects for transmission of data have been described, the protocol is not limited to such aspects but rather may define additional and/or different physical aspects related to transmitting data. For example, the protocol may define a link bit error rate (BER; i.e., the statistical probability of a transmitted bit being erroneously received in a communication system) less than or equal to $10^{-12}$, where the BER applies to encoded data streams placed on the transmission medium.

The second layer of the protocol defines encoding and decoding of a data packet. The protocol defines that data is encoded and decoded in accordance with an adaptive 8B/10B code (described in U.S. Pat. No. 4,486,739 to Franaszek, et al., entitled "Byte Oriented DC Balanced (0,4) 8B/10B Partitioned Block Transmission Code") to bind the maximum run length of the code, maintain DC-balance, and provide word alignment. According to the protocol, encoding results in transmission characters, which can represent an encoded data packet. Two types of transmission characters are referred to as data and special. Data transmission characters represent encoded data packets (e.g., an image data packet or a control data packet, as will be discussed later), whereas special transmission characters represent other types of information that may be transmitted. For example, special transmission characters can be used to identify frame boundaries and transmit primitive function requests. As part of defining encoding and decoding, the second layer may define error detection and/or correction for encoding and/or decoding. In alternative implementations other types of encoding and decoding methods may be defined by the protocol and those types of encoding and decoding may also maintain a DC-balance of encoded data.

The third layer of the protocol defines a frame format for different types of data packets, which includes defining components of each type of data packet. Data packets are defined to include a start of frame, a data section, and an end of frame. The protocol defines the length and content of data packets depending on the type of data packet. For example, in a printing system, two types of data packets may exist, an image data packet and a control data packet, where an image data packet can contain image data used for printing and a control data packet may include commands or other types of control information. Thus, the start of frame, data section, and end of frame may differ for each type of data packet, both in terms of content and length. In addition, depending on the type of control packet, content of the data packet may differ. For example, different start of frames may be used for different types of control data packets. In that example, a control data packet that queries a printing system for the temperature of a printing module may use a different start of frame than a control data packet that commands the printing system to increase the temperature of the printing module. In alternative implementations the frame format may include additional and/or different components. For example, a data packet may further include a header.

The protocol described above may be a modification of an existing protocol. As a modified protocol, finding materials that are compliant with the protocol and standards that have been reliably tested for the existing protocol may ease the creation and use of the protocol. As one example, the protocol may be a modification of the Fibre Channel Protocol (hereinafter "FCP"; specification available from American National Standards Institution, New York, N.Y. and significantly described in ANSI X3.230-1994, incorporated herein by reference). A modified FCP (MFCP) may include the first two layers of the FCP (i.e., FC-0 and FC-1) as the first two layers of the protocol, and may further take aspects of the third layer of the FCP (i.e., FC-2) that define frame format of a data packet, as defined above. In alternative implementations, the related Gigabit Ethernet Protocol (hereinafter "GEP") (IEEE 802.3ae 10 Gigabit Ethernet standard or IEEE 802.3z Gigabit Ethernet Standard) may be used.

The MFCP may consume less computing resources than the full FCP because there are fewer layers, and each of the lower layers is unlikely to be considered resource intensive in contrast to higher level services that are required in the higher levels of the FCP. In addition, the protocol can facilitate immediate action on transmitted data because of typically minimal resource requirements imposed on a transmitting party and a receiving party for the lower levels of the protocol. For example, data may be transmitted just in time for printing because of the minimal resources required to transmit and receive data. Also, the MFCP may realize other advantages provided by the lower levels of the FCP, including the bandwidth and distance advantages. For example, a large industrial printing system that requires large amounts of image data for each scan line that is printed may adopt the MFCP because the bandwidth provided can accommodate the needs of such a system. Also, because of the interoperability of layers in the FCP and the low resource consumption of the MFCP, a system, such as a printing system, can implement an off-the-shelf FPGA (field programmable gate array) to handle transmission of data, in lieu of a typically more complex computing system.

Figure 11:
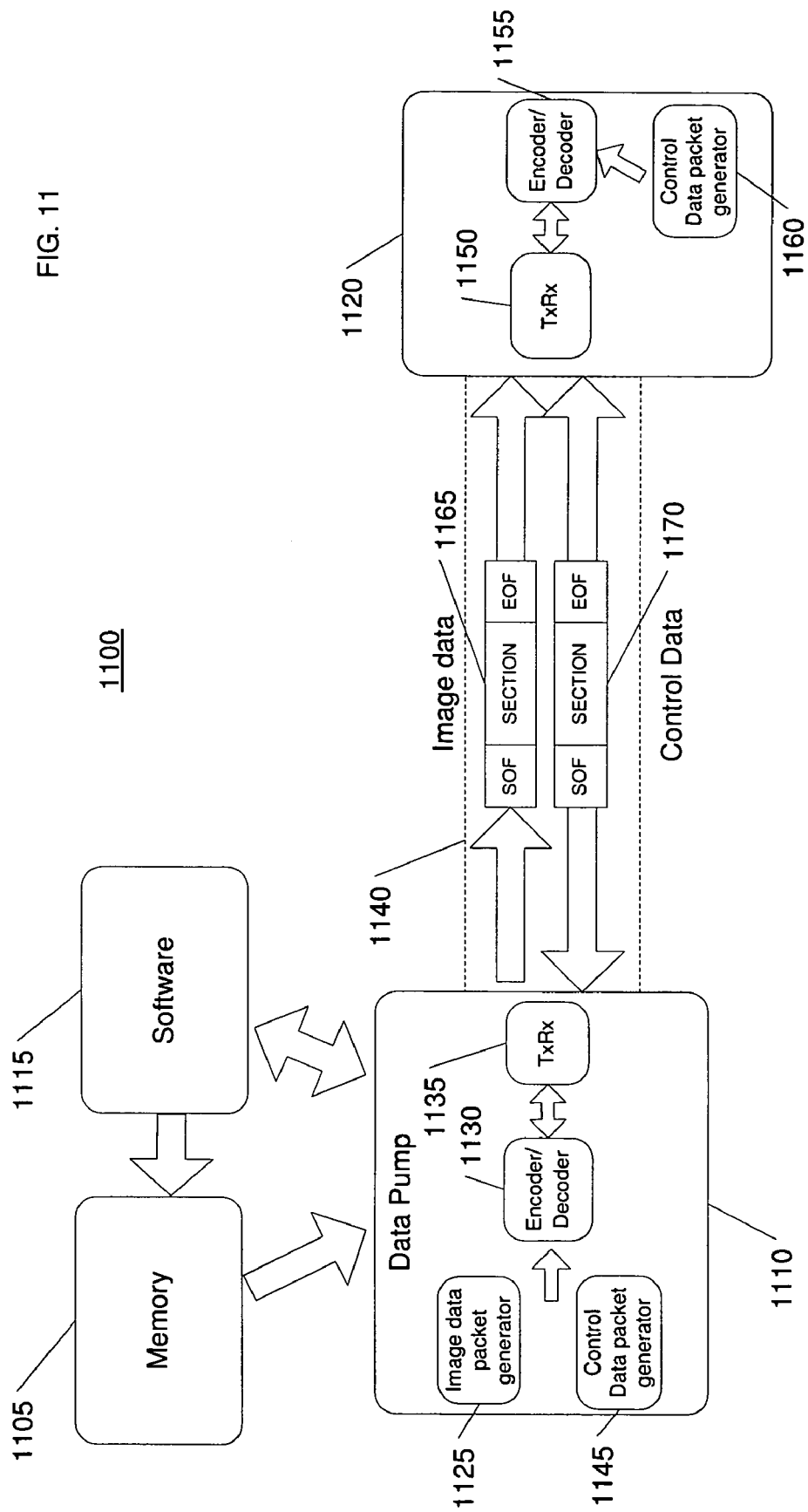
FIG. 11 is a diagram of a system for transmitting data according to a protocol.

FIG. 11 is diagram of a system 1100 for transmitting data according to a protocol. The protocol used for transmitting data may be the MFCP, as described above. The system 1100 includes a memory 1105, a data pump 1110, software 1115, and a printing device 1120. The memory 1105, data pump 1110, and software 1115 may be contained in an ordinary personal computer (PC). The memory 1105 may be DMA-accessible memory available via a Peripheral Component Interconnect (PCI) bus, PCI-X (Peripheral Component Interconnect Extended) bus, PCI Express bus, or other suitable bus. The memory is used to store image data for processing by the data pump 1110.

The software 1115 can control transmission of image data and can send image data to the memory 11 05. The data pump 1110 can use image data to generate an image data packet at an image data packet generator 1125. Generating an image data packet may include serializing the image data packet at the image data packet generator 1125. In addition to sending image data to the memory 1105, the software 1115 can send control data to the data pump 1110. Control data may include any type of data that can be used to control the printing device 1120. A control data packet can be generated from control data at the control data packet generator 1145.

Image data packets, such as the image data packet 1165, include a start of frame, a data section, and an end of frame. The data section includes image data that can be used at a printing device for printing. The protocol that defines the frame format for the image data packet may define that an image data packet should include one or more scan lines of image data and a certain start of frame and end of frame. For example, the protocol may define an image data packet to include a 32-bit start of frame, 3,552 bits of bitmap image data as the data section representing one or more scan lines, and a 32-bit end of frame.

Portions of a scan line in an image data packet may correspond to a print element association at a printing device. As an example, if a printing device includes eight print element associations, a data packet framed for that printing device might include image data representing eight portions of a scan line-one portion for each print element association. An image data packet need not be limited to including data from a single image. For example, the protocol may define that an image data packet should include a portion of an image for each print element association, where each portion is sufficient to cause a print element association to print once (e.g., if the print elements are inkjet printing nozzles, this would be a single firing of inkjet nozzles, also referred to as a single impression). In that example, a data packet may include image data portions from two images, in a system with eight print element associations, if a first four portions of image data correspond to a first image and a second four portions of image data correspond to a second image. If a single data packet can include image data from two different images, the data packet may advantageously allow the printing of two images (alike or similar) on two different workpieces. Similarly, a data packet may contain image information from several different images, allowing printing of these images simultaneously by corresponding print element associations. In alternative implementations, a data packet need not represent one or more scan lines, rather a data packet may be defined to include other divisions (i.e., portions) of image data that correspond to print element associations. For example, if each print element association prints a certain color, image data may be divided and included in a data packet such that the portions of image data may correspond to different colors that need to be printed by different print element associations.

Control data packets, such as the control data packet 1170, include a start of frame, a data section, and an end of frame. The data section represents control information. For example, the data section may include a command from the data pump-side to the printer-side of the diagram, or status information from the printer-side to the data pump-side of the diagram. Commands may include a query for a temperature of a printing module, a command to increase or decrease a temperature of a printing module, a command to change the spacing or print elements, and the like. Status information may include, a temperature of a print module, a spacing of print elements, a number of print elements, and the like.

The transmitting and receiving of data packets may logically include two data channels, where a first data channel is a unidirectional image data channel from the data pump 1110 to the printing device 1120, and a second channel is a bi-directional control data channel. Data packets may be interleaved, such that control data packets are sent from the data pump 1110 to the printing device 1120 when image data packets are not being sent. For example, control data packets may be sent immediately after image data packets when there is enough bandwidth to support the sending of a control data packet without interfering with the transmission of image data packets. As another example, certain times in printing an image, for example between images or print jobs, may be a period of time that is used for transmission of control data packets. Because, according to the protocols discussed above, there may be bi-directional serial communication that includes a transmitting line and a receiving line, control data packets may be sent from the printing device 1120 to the data pump 110 while image data packets are sent to the printing device 1120. A definition of two logical channels for transmitting data, and various aspects of those channels, may be included in one of the protocols described earlier, for transmitting data.

Image data packets and control data packets are encoded at the encoder/decoder 1130. The encoder/decoder 1130 may encode data according to the 8B/10B-encoding scheme. Encoded data packets are transmitted by the transceiver 1135. The transceiver 1135 is operative to transmit and receive data packets across a transmission line 1140 that is connected to the printing device 1120.

At the printing device 1120, control electronics, such as control electronics embedded in an FPGA, are operative to transmit and/or receive data packets at the transceiver 1150, which is operative to transmit and/or receive data packets. Data packets may be encoded and/or decoded at the encoder/decoder 1155 according to the 8B/10B-encoding scheme. In alternative implementations, a technique other than 8B/10B-encoding may be used to ensure DC balance through the physical communication interface. Some alternative implementations (notably those over short distances) might not require DC balance in the transmission medium, and may use non-balanced encoding techniques. Control packets can be generated at a control packet generator 1160. These control packets may include, for example, status information, such as the temperature of a printing module. Control packets may be generated at the printer-side in response to a control packet that was sent from the data pump-side.

All of the components and processes described in reference to FIG. 11 may conform to one or more of the protocols described above. According to the MFCP, the first layer of the protocol defines the standards for the transceivers 1135 and 1150, the transmission line 1140, and other physical aspects of transmission. The second layer of the MFCP defines the encoding and decoding scheme used by the encoder/decoders 1130 and 1155. The third layer of the MFCP defines the frame format for the data packets that are generated by the image data packet generator 1125, the control data packet generator 1145, and the control data packet generator 1160.

Figure 12:
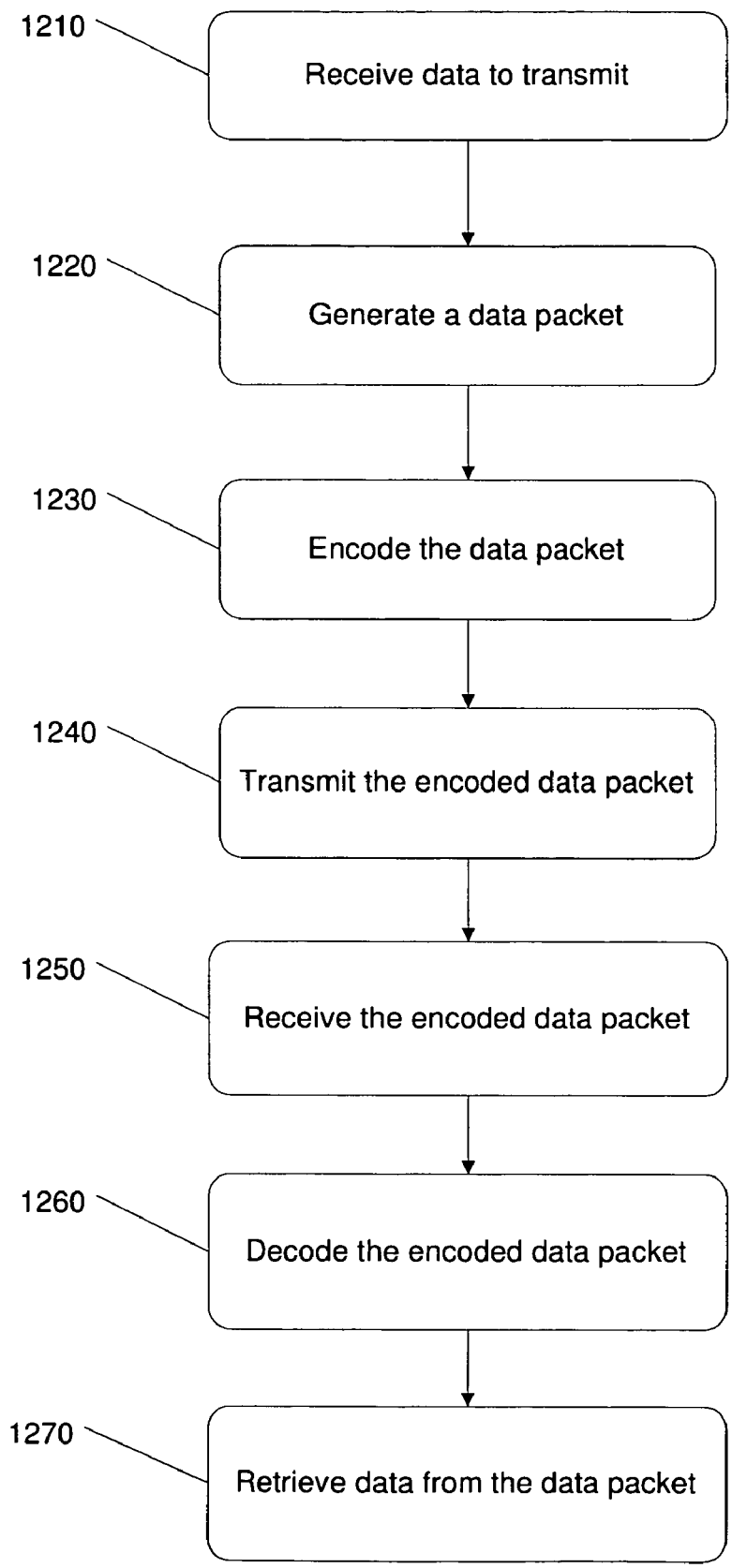
FIG. 12 is a flowchart of a process of transmitting data according to a communications protocol.

FIG. 12 is a flowchart of a process of transmitting data according to a protocol. In the flowchart, data is transmitted from a sending device to a receiving device. For example, the flowchart may illustrate a method of sending data from a computer system to an external printing device. The protocol to which the transmission of data conforms may be one of the protocols described earlier.

At 1210, data is received that is to be transmitted from the sending device to the receiving device. As an example, the data may be image data or control data that is to be sent from control electronics, such as the control electronics 1060, to a printing device. The data may be received at a data pump, or any other component of a sending device.

At 1220, a data packet is generated. As examples, if the data is image data, an image data packet is generated, or if the data is control data, a control data packet is generated. The data packet is generated in accordance with the third layer of the protocol. Because the third layer of the protocol may describe the frame format, the data packet may include frame components such as a start of frame, a data section, and an end of frame. The data packet that is generated may merely include the received data in the data section and generate the other components according to the frame format, or the data packet that is generated may include a translated version of the received data. For example, if control data is received by way of a command to a printing device, a control data packet may be generated that represents the command, but need not necessarily include the command (e.g., a data section may include a code that corresponds to a command). As another example, if the data is image data, the image data may be received with delays already in place, with the delays corresponding to a layout of print element associations at a printing device, or delays may be included in the image data at 1220.

At 1230, the data packet is encoded. The data packet is encoded according to a second layer of the protocol, which defines encoding and decoding of data packets, and may further define error detection and error correction. The data packet may be encoded according to the 8B/10B-encoding scheme at the sending device. According to that scheme, every 8 bits of the data packet may be encoded into a 10-bit transmission character. Converting the bits to a transmission character may take into account a running disparity and ensure that there is a balance of "1"s and "0"s in a data stream to ensure appropriate conditions for transmission of data (e.g., DC balance).

At 1240, the encoded data packet is transmitted from the sending device to the receiving device. The encoded data packet is transmitted according to a first layer of the protocol. The first layer of the protocol defines physical aspects of transmission. Thus, the first layer of the protocol may define a transmitter (which may be part of a transceiver), a transmission line, and a receiver (which may be part of the same transceiver). Aspects may include the speed of transmission; how a logical "1" or "0" should be represented, depending on the type of transmission line used; types of acceptable transmission line; and speed of data transmission supported for the transmitter, receiver, and transmission line.

At 1250, the data packet is received. The data packet can be received at the receiving device, which may be, for example, a printing device. More particularly, the data packet may be received at a receiver that may be an FPGA that is part of a printing device, and as described earlier, the receiver is defined in accordance with the first layer of the protocol.

At 1260, the data packet, which is encoded, is decoded. The data packet is decoded in accordance with the second layer of the protocol. Thus, for example, the data packet may be decoded in accordance with the 8B/10B-encoding scheme. The data packet may be decoded at a hardware decoder that may, for example, be part of an FPGA that also includes the receiver.

At 1270, data is retrieved from the data packet. For example, if a data packet is an image data packet, the image data is retrieved from the data packet and the image data may be used to immediately print a scan line of image data. As another example, if a data packet is a control data packet, control information from the data packet may be interpreted and actions may be performed, for example, at a printing device.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, although the process described in FIG. 12 is composed of a certain number and kind of processes, alternative implementations may include additional and/or different processes. Accordingly, other implementations are within the scope of the following claims.

What is claimed is:

1. A method of transmitting data between a computer system and an external printing device, the method comprising:
   processing an image at the computer system for printing;
   generating, at the computer system, a data packet that embodies the image processing in accordance with a communications protocol, the protocol defined to consist essentially of:
     a first layer defining transmission line, transmitters, and receivers for transmission of the data packet,
     a second layer defining encoding and decoding of the data packet, and
     a third layer defining a frame format of the data packet,
     wherein generating the data packet comprises encoding the data packet according to the second layer of the protocol in a frame format according to the third layer of the protocol;
   transmitting the data packet from the computer system to the external printing device, wherein the data packet is transmitted according to the first layer of the protocol; and
   decoding the data packet in accordance with the second layer of the protocol at the external printing device.

2. The method of claim 1, wherein the external printing device implements the second and third layers of the protocol in an FPGA device.

3. The method of claim 1, wherein:
   the method further comprising sending image data in a first of two channels;
   transmitting the data packet comprises sending a control data packet in a second of the two channels;
   the first channel is a one-way channel for image data from the computer system to the external printing device; and
   the second channel is a bi-directional channel for control information found in the control data packet.

4. The method of claim 3, wherein the two channels are interleaved in a single serial data channel from the computer system to the external printing device.

5. The method of claim 1, wherein the first layer is defined in accordance the first layer of the Fibre Channel Protocol.

6. The method of claim 1, wherein the first layer is defined in accordance the first layer of the IEEE 802.3z Gigabit Ethernet Protocol.

7. The method of claim 1, wherein the second layer defines the encoding and decoding in accordance with the 8B/10B-encoding scheme.

8. The method of claim 1, wherein the second layer is defined in accordance with the second layer of the Fibre Channel Protocol.

9. The method of claim 1, wherein the frame format for the third layer of the protocol defines the data packet to comprise a start of frame, a data section, and an end of frame.

10. The method of claim 9, wherein the data section is defined to comprise a portion of image data for each of a plurality of print element associations at the external printing device.

11. The method of claim 10, wherein the portions of image data are time-shifted based on a deployment of the print element associations.

12. The method of claim 9, wherein the data section is defined to represent one or more printed scan lines, each printed scan line corresponding to a print element association at the external printing device.

13. The method of claim 1, wherein processing the image at the computer system for printing comprises dividing image data into multiple image queues.

14. The method of claim 1, wherein processing the image at the computer system for printing comprises inserting delays into image data.

15. The method of claim 1, further comprising synchronizing printing of the image at the external printing device from the computer system.

16. A system comprising:
a computer system comprising electronics defined in accordance with a first layer of a protocol essentially consisting of three layers, the computer system configured to perform operations comprising:
bi-directionally communicating control data for controlling printing across a first transmission line with an external printing device in accordance with a second and a third layer of the protocol, wherein:
the first layer of the protocol defines transmission line, transmitters, and receivers for transmission of data packets,
the second layer of the protocol defines encoding and decoding of the data packets, and
the third layer of the protocol defines a frame format of the data packets; and
the first transmission line is configured in accordance with the first layer of the protocol.

17. The system of claim 16 further comprising the external printing device, wherein the external printing device implements the second and third layers of the protocol in an FPGA device.

18. The system of claim 16, wherein the computer system communicates with the external printing device across one of two channels, the first being a one-way channel for image data from the computer system to the external printing device, and the second channel being a bi-directional channel for control information.

19. The system of claim 18, wherein the two channels are interleaved in a single serial data channel from the computer system to the external printing device.

20. The system of claim 16, wherein the frame format for the third layer of the protocol defines a data packet to comprise a start of frame, a data section, and an end of frame.

21. The system of claim 20, wherein the data section is defined to comprise a portion of image data for each of a plurality of print element associations at the external printing device.

22. The system of claim 21, wherein the portions of image data are time-shifted based on a deployment of the print element associations.

23. The system of claim 20, wherein the data section is defined to represent one or more printed scan lines, each printed scan line corresponding to a print element association at the external printing device.

24. The system of claim 16, wherein the control data comprises an indication of a leading edge of a workpiece.

25. A system comprising:
an external printing device comprising electronics defined in accordance with a first layer of a protocol consisting essentially of three layers, the external printing device configured to perform operations comprising:
bi-directionally communicating control data for controlling printing across a first transmission line with a computer system in accordance with a second and a third layer of the protocol, wherein:
the first layer of the protocol defines transmission line, transmitters, and receivers for transmission of data packets,
the second layer of the protocol defines encoding and decoding of the data packets, and
the third layer of the protocol defines a frame format of the data packets; and
the first transmission line is configured in accordance with the first layer of the protocol.

26. The system of claim 25 wherein the external printing device comprises:
a packetized image data receiver defined in accordance with a first layer of a data transmission protocol and configured to receive packetized image data; and
an image data decoder configured to decode transmission characters in the packetized image data in accordance with the second layer of the protocol.

27. The system of claim 26 wherein the external printing device further comprises a control packet generator configured to generate control packets defining the frame format for the packetized image data in accordance with the third layer of the protocol.

28. The system of claim 25 wherein the external printing device comprises a collection of one or more latches configured to trigger printing of data stored in the latches upon receipt of subsequent data.

29. The system of claim 25, wherein the control data comprises an indication of a leading edge of a workpiece.

30. A method of transmitting data between a computer system and an external printing device, the method comprising:
at the computer system,
dividing image data according to associations of print elements of the external printing device, and
encoding and transmitting the divided image data in accordance with a three layer data transmission protocol; and
at the external printing device,
receiving and decoding the divided image data in accordance with the three layer data transmission protocol; and
printing the divided image data using the associations of print elements.

31. The method of claim 30, further comprising:
at the computer system, time-shifting image data based on a deployment of the print element associations at the external printing device.

* * * * *

UNITED STATES PATENT AND TRADEMARK OFFICE
CERTIFICATE OF CORRECTION

PATENT NO. : 8,068,245 B2
APPLICATION NO. : 10/966019
DATED : November 29, 2011
INVENTOR(S) : Gardner et al.

It is certified that error appears in the above-identified patent and that said Letters Patent is hereby corrected as shown below:

Column 22, line 58, in Claim 5, after "accordance" insert -- with --

Column 22, line 60, in Claim 6, after "accordance" insert -- with --

Column 23, line 50, in Claim 18, delete "hi-" and insert -- bi- --

Signed and Sealed this
Twenty-eighth Day of February, 2012

David J. Kappos
*Director of the United States Patent and Trademark Office*